(12) United States Patent
Omi

(10) Patent No.: US 10,282,829 B2
(45) Date of Patent: May 7, 2019

(54) IMAGE PROCESSING APPARATUS FOR PROCESSING X-RAY IMAGE, RADIATION IMAGING SYSTEM, IMAGE PROCESSING METHOD, AND STORAGE MEDIUM

(71) Applicant: CANON KABUSHIKI KAISHA, Tokyo (JP)

(72) Inventor: Hiroyuki Omi, Kamakura (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 362 days.

(21) Appl. No.: 15/051,524

(22) Filed: Feb. 23, 2016

(65) Prior Publication Data
US 2016/0171671 A1    Jun. 16, 2016

Related U.S. Application Data

(63) Continuation of application No. 13/309,465, filed on Dec. 1, 2011.

(30) Foreign Application Priority Data

Dec. 9, 2010   (JP) ................................. 2010-275145
Oct. 28, 2011  (JP) ................................. 2011-237570

(51) Int. Cl.
  *G06K 9/00*   (2006.01)
  *G06T 5/00*   (2006.01)
  *G06T 7/11*   (2017.01)

(52) U.S. Cl.
  CPC ............. *G06T 5/009* (2013.01); *G06T 7/11* (2017.01); *G06T 2207/10116* (2013.01); *G06T 2207/20208* (2013.01)

(58) Field of Classification Search
  None
  See application file for complete search history.

(56) References Cited

U.S. PATENT DOCUMENTS

| | | | |
|---|---|---|---|
| 4,999,497 A | 3/1991 | Funahashi et al. |
| 6,314,198 B1 | 11/2001 | Ogura |
| 6,370,265 B1 | 4/2002 | Bell et al. |
| 7,012,625 B1 | 3/2006 | Kobayashi et al. |
| 7,054,473 B1 | 5/2006 | Roehrig et al. |
| 2003/0091222 A1 | 5/2003 | Young et al. |
| 2003/0161518 A1 | 8/2003 | Vuylsteke |

(Continued)

FOREIGN PATENT DOCUMENTS

| | | |
|---|---|---|
| JP | H06-78910 A | 3/1994 |
| JP | 2006-102044 A | 4/2006 |

*Primary Examiner* — Sean M Conner
(74) *Attorney, Agent, or Firm* — Canon U.S.A., Inc. IP Division

(57) ABSTRACT

An image forming apparatus includes a conversion acquisition unit configured to acquire a gradation conversion characteristic based on an X-ray image captured by an X-ray sensor, a storage unit configured to store a pixel value range in which a signal-to-noise ratio is higher than a threshold value according to a characteristic of the X-ray sensor, a determination unit configured to determine whether a pixel value range in which gradation is widened according to the gradation conversion characteristic is included in the stored pixel value range, and a correction unit configured to correct the gradation conversion characteristic depending on a result of determination by the determination unit.

16 Claims, 15 Drawing Sheets

(56) References Cited

U.S. PATENT DOCUMENTS

| | | |
|---|---|---|
| 2005/0018894 A1 | 1/2005 | Couwenhoven et al. |
| 2005/0135665 A1 | 6/2005 | Shinbata |
| 2006/0055991 A1 | 3/2006 | Minakuti et al. |
| 2006/0187314 A1* | 8/2006 | Fujie .................. H04N 5/2351 348/222.1 |
| 2007/0263929 A1 | 11/2007 | Kaji |
| 2009/0136110 A1 | 5/2009 | Kaji |
| 2009/0285464 A1* | 11/2009 | Urushiya ................. G06T 5/50 382/131 |
| 2010/0020341 A1 | 1/2010 | Enjuji |
| 2010/0086182 A1 | 4/2010 | Luo et al. |
| 2011/0080487 A1 | 4/2011 | Venkataraman et al. |
| 2011/0108735 A1* | 5/2011 | Ruetten ................... G01T 1/24 250/371 |
| 2011/0188720 A1 | 8/2011 | Narayanan et al. |

* cited by examiner

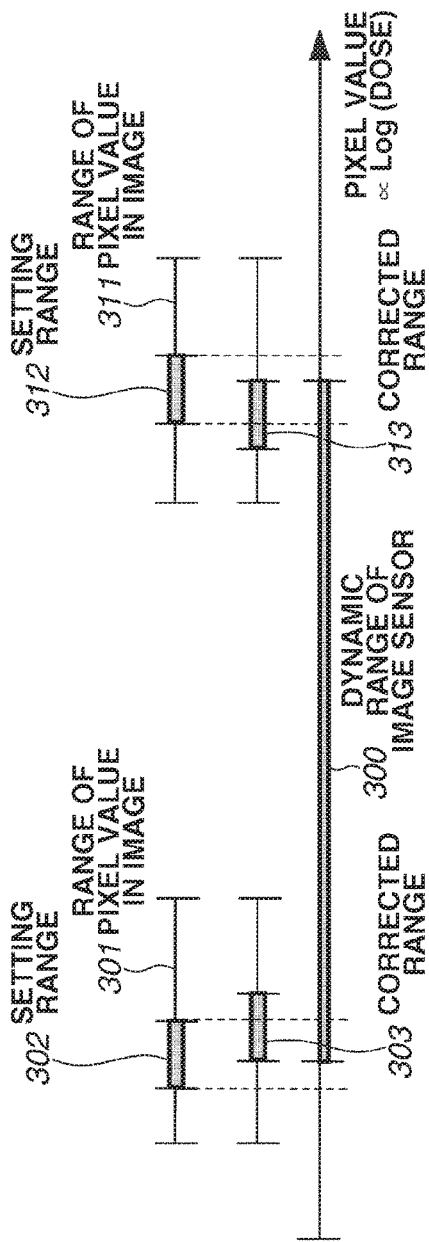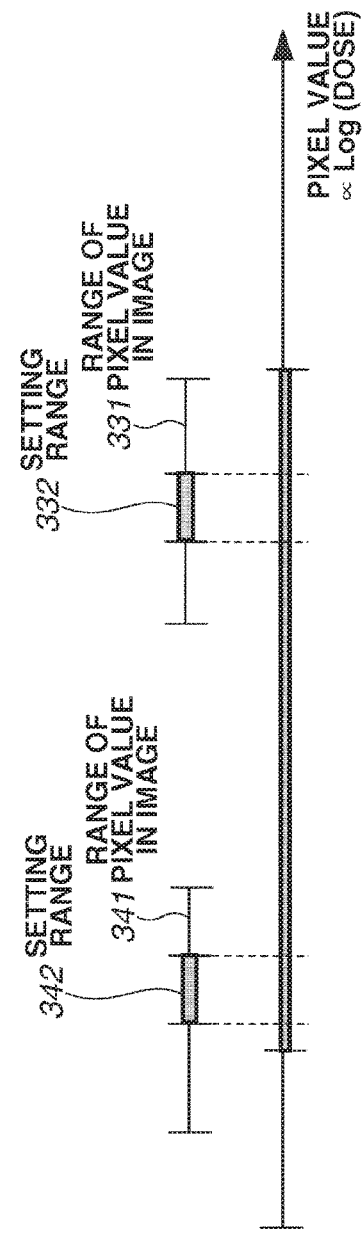

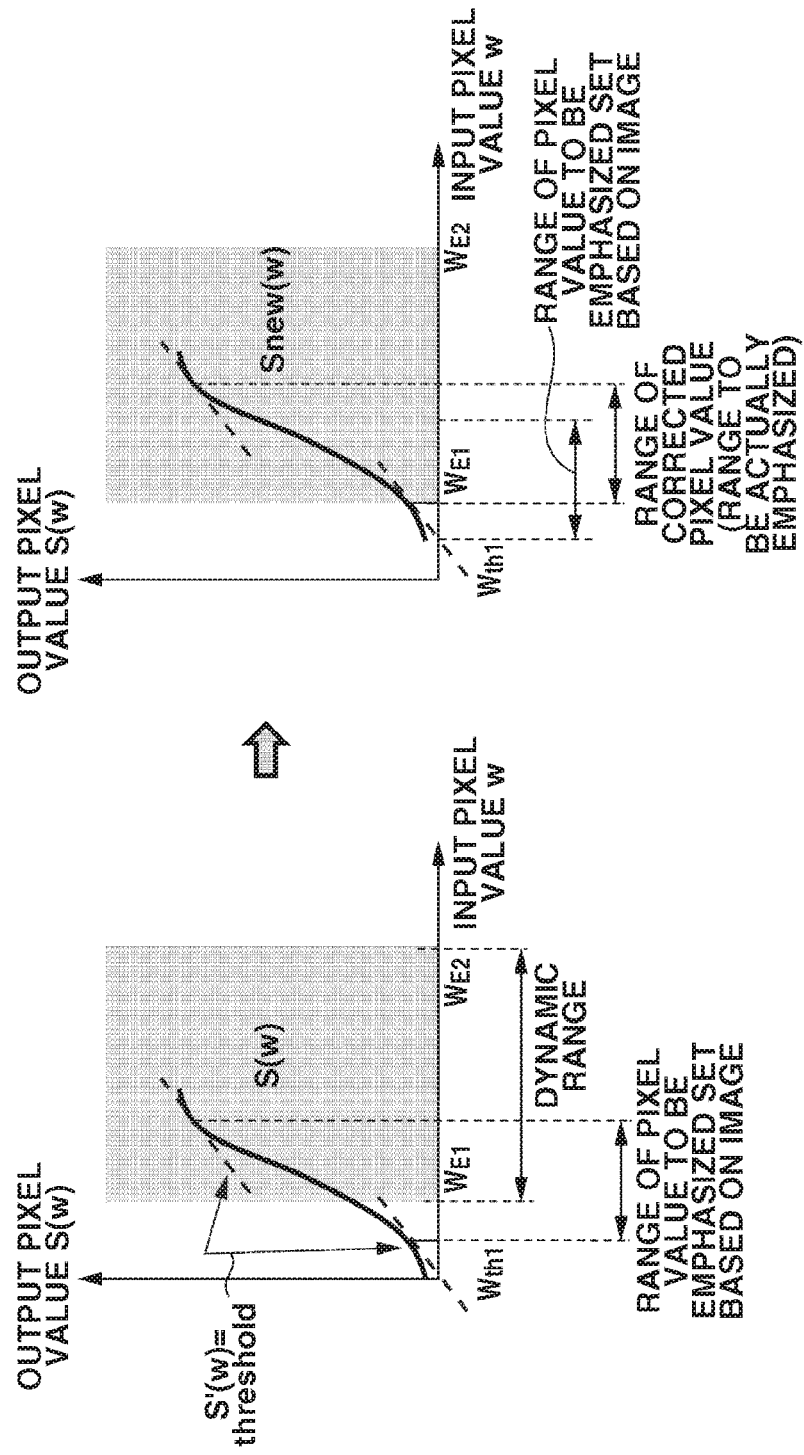

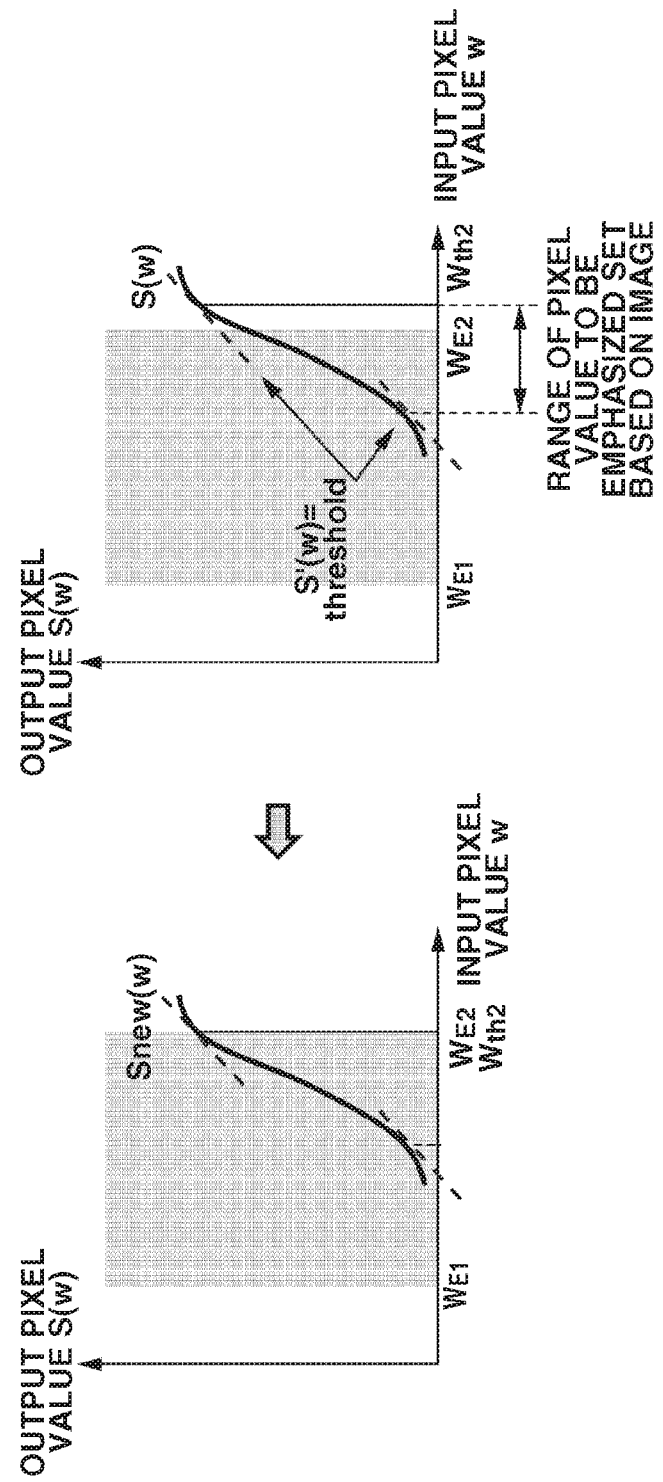

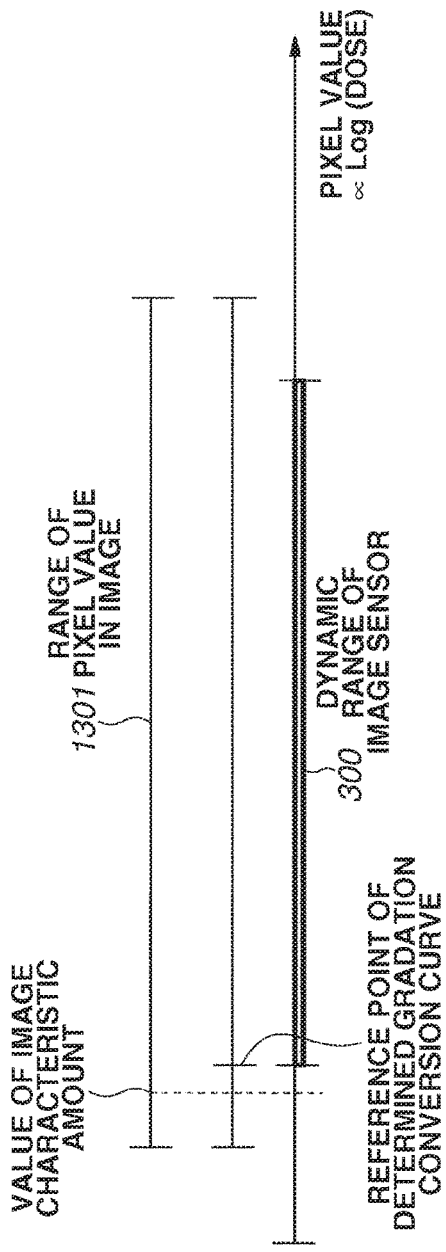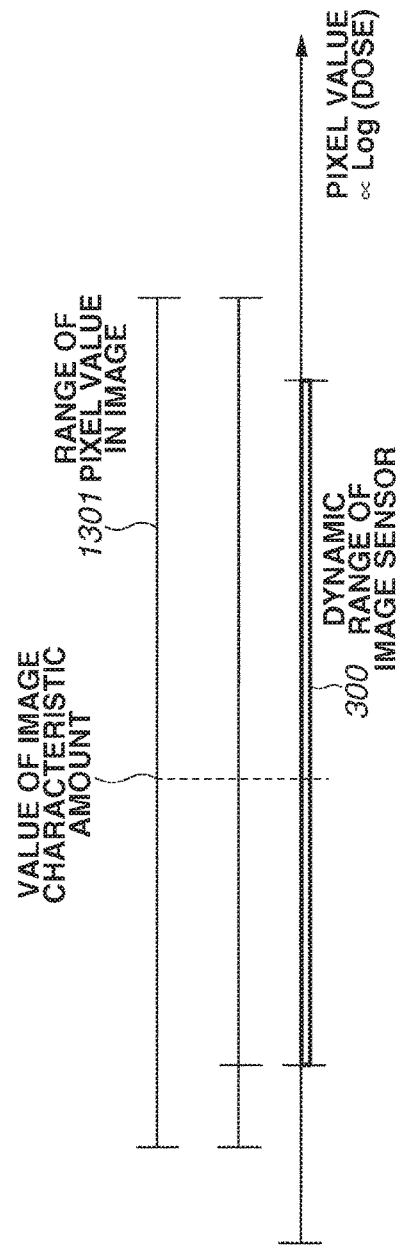

IMAGE PROCESSING APPARATUS FOR PROCESSING X-RAY IMAGE, RADIATION IMAGING SYSTEM, IMAGE PROCESSING METHOD, AND STORAGE MEDIUM

CROSS-REFERENCE TO RELATED APPLICATIONS

This application is a Continuation of co-pending U.S. patent application Ser. No. 13/309,465 filed Dec. 1, 2011, which claims foreign priority benefit of Japanese Patent Applications No. 2010-275145 filed Dec. 9, 2010, and No. 2011-237570 filed Oct. 28, 2011. The disclosures of the above-named applications are hereby incorporated by reference herein in their entirety.

TECHNICAL FIELD

The present invention relates to image processing for an X-ray image captured by an X-ray sensor.

BACKGROUND

In a digital imaging system, an amount of light received by an image sensor is adjusted, and an output characteristic with respect to the amount of received light is adjusted, to reduce a loss of shadow detail and a loss of highlight detail. An output image is processed, to keep a standard of quality of the image. When an X-ray imaging system is taken as an example of a digital imaging system, a dose control mechanism controls an X-ray source so that an input dose that reaches the image sensor is adjusted. An output value with respect to the input dose is adjusted by changing a gain of the image sensor. An X-ray image obtained depending on the adjusted output value is subjected to image processing such as compression/enlargement processing for a gradation number and contrast emphasis processing for emphasizing a particular parameter of the image.

As a technique for performing image processing according to a dose and an input/output characteristic, and suppressing an effect of a fluctuation in pixel value has been known. For example, Japanese Patent Application Laid-Open No. 2008-42448 discusses a technique for weakening, when a dose is frequently changed in moving image capturing, a response to image processing until the dose is stabilized. US 2006/0055991 discusses a method for changing a gain of a sensor according to a luminance range of a subject to fall within a sensitivity area of the sensor and performing gradation conversion using a function set for each gain. However, if an image that greatly deviates from a range in which an output characteristic is good is obtained, there is an issue in noise emphasis when a gradation is converted without considering the output characteristic.

SUMMARY

According to an aspect of the present invention, an image forming apparatus includes a conversion acquisition unit configured to acquire a gradation conversion characteristic based on an X-ray image captured by an X-ray sensor, a storage unit configured to store a pixel value range in which a signal-to-noise ratio is higher than a threshold value according to a characteristic of the X-ray sensor, a determination unit configured to determine whether a pixel value range in which gradation is widened according to the gradation conversion characteristic is included in the stored pixel value range, and a correction unit configured to correct the gradation conversion characteristic depending on a result of determination by the determination unit.

According to another aspect of the present invention, an image processing apparatus includes an acquisition unit configured to acquire a reference pixel value for gradation conversion based on an X-ray image captured by an X-ray sensor, a storage unit configured to store a pixel value range in which a signal-to-noise ratio is higher than a threshold value according to a characteristic of the X-ray sensor, a first determination unit configured to determine whether the reference pixel value is included in the stored pixel value range, and a second determination unit configured to determine a gradation conversion characteristic depending on a result of determination by the first determination unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 3A and 3B illustrate an outline of processing by the image processing apparatus according to the first exemplary embodiment.

FIGS. 6A and 6B illustrate examples of correction of a gradation conversion curve according to the first exemplary embodiment.

FIGS. 13A and 13B illustrate an outline of processing by the image processing apparatus according to the sixth exemplary embodiment.

DESCRIPTION OF THE EMBODIMENTS

Various exemplary embodiments, features, and aspects of the invention will be described in detail below with reference to the drawings.

A radiation imaging system according to a first exemplary embodiment will be described with reference to FIGS. 1 to 5.

Figure 1:
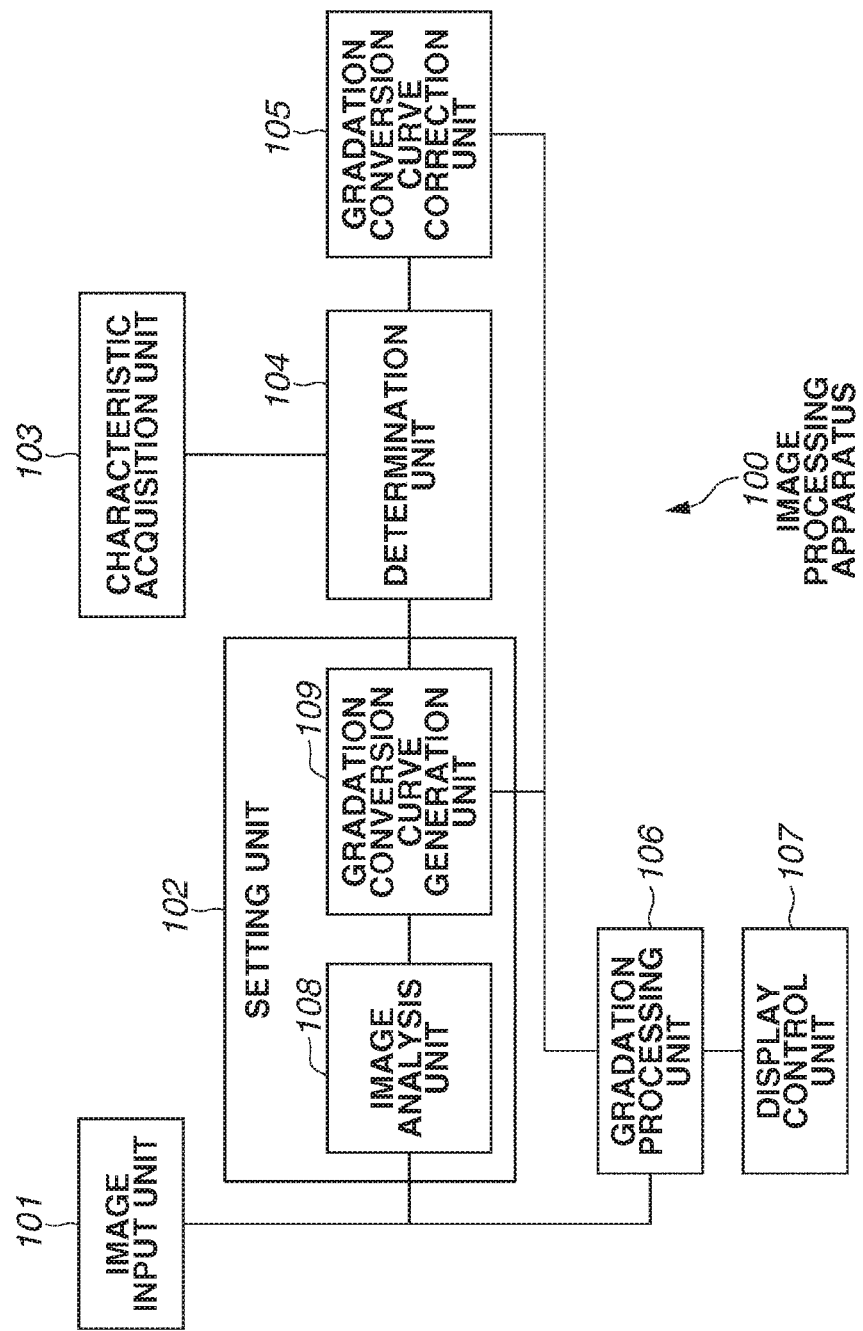
FIG. 1 illustrates a configuration of an image processing apparatus according to a first exemplary embodiment of the present invention.

FIG. 1 illustrates a configuration of an image processing apparatus 100 according to the first exemplary embodiment. The image processing apparatus 100 may be implemented by separate hardware circuits controlled by central processing unit (CPU), such as a microprocessor. Alternatively, the image processing 100 may be implemented by a general purpose computer which can be specifically programmed to execute software modules stored in non-transitory computer-readable media. The image processing apparatus 100 includes an image input unit 101, a setting unit 102, a characteristic acquisition unit 103, a determination unit 104, a gradation conversion curve correction unit 105, a gradation processing unit 106, and a display control unit 107. The image input unit 101 acquires an image captured by an image sensor in which a sensor characteristic for the image is corrected. The image, which has not been processed yet by the image processing apparatus 100, is referred to as an original image.

The setting unit 102 sets a pixel value range in which a contrast is emphasized for an input image. In the present exemplary embodiment, this processing is implemented by an image analysis unit 108 and a gradation conversion curve generation unit 109, which are included in the setting unit 102. The image analysis unit 108 calculates, from the original image, information required for gradation processing for the original image, and outputs an analysis result. The gradation conversion curve generation unit 109 generates a gradation conversion curve for making the original image appropriate based on the analysis result. A pixel value range to be emphasized is set by a slope of the gradation conversion curve. In the gradation conversion curve generation unit 109, not only the gradation conversion curve but also a look-up table (LUT) representing an output pixel value with respect to an input pixel value may be generated. Further, an area to be emphasized in the image may be set so that the gradation conversion curve need not be generated.

The characteristic acquisition unit 103 acquires from a storage unit a value representing a dynamic range of the image sensor used when the original image is captured. The dynamic range means a range of a dose at which an output characteristic is good with respect to a dose of the image sensor or a pixel value range corresponding thereto.

The determination unit 104 determines whether the pixel value range to be emphasized, which has been set by the setting unit 102, is included within the dynamic range. If it is determined that the pixel value range to be emphasized is not included within the dynamic range, the gradation conversion curve correction unit 105 receives input of the gradation conversion curve, corrects the pixel value range to be emphasized in the image to be included within the dynamic range, and outputs the corrected gradation conversion curve. On the other hand, if it is determined that the pixel value range to be emphasized is included within the dynamic range, the gradation conversion curve correction unit 105 does not correct the gradation conversion curve. The gradation processing unit 106 receives input of the gradation conversion curve which has not been corrected, or the gradation conversion curve which has already been corrected, and the original image, and outputs an image after gradation processing. The display control unit 107 outputs the image after the gradation processing to a display unit.

While the image processing apparatus 100 may be implemented by one or more electronic circuits, the image processing apparatus 100 can also be implemented by computer-executable software stored in non-transitory computer-readable media. Preferably, however, the above-mentioned units may be implemented by combination of software and hardware.

Figure 2:
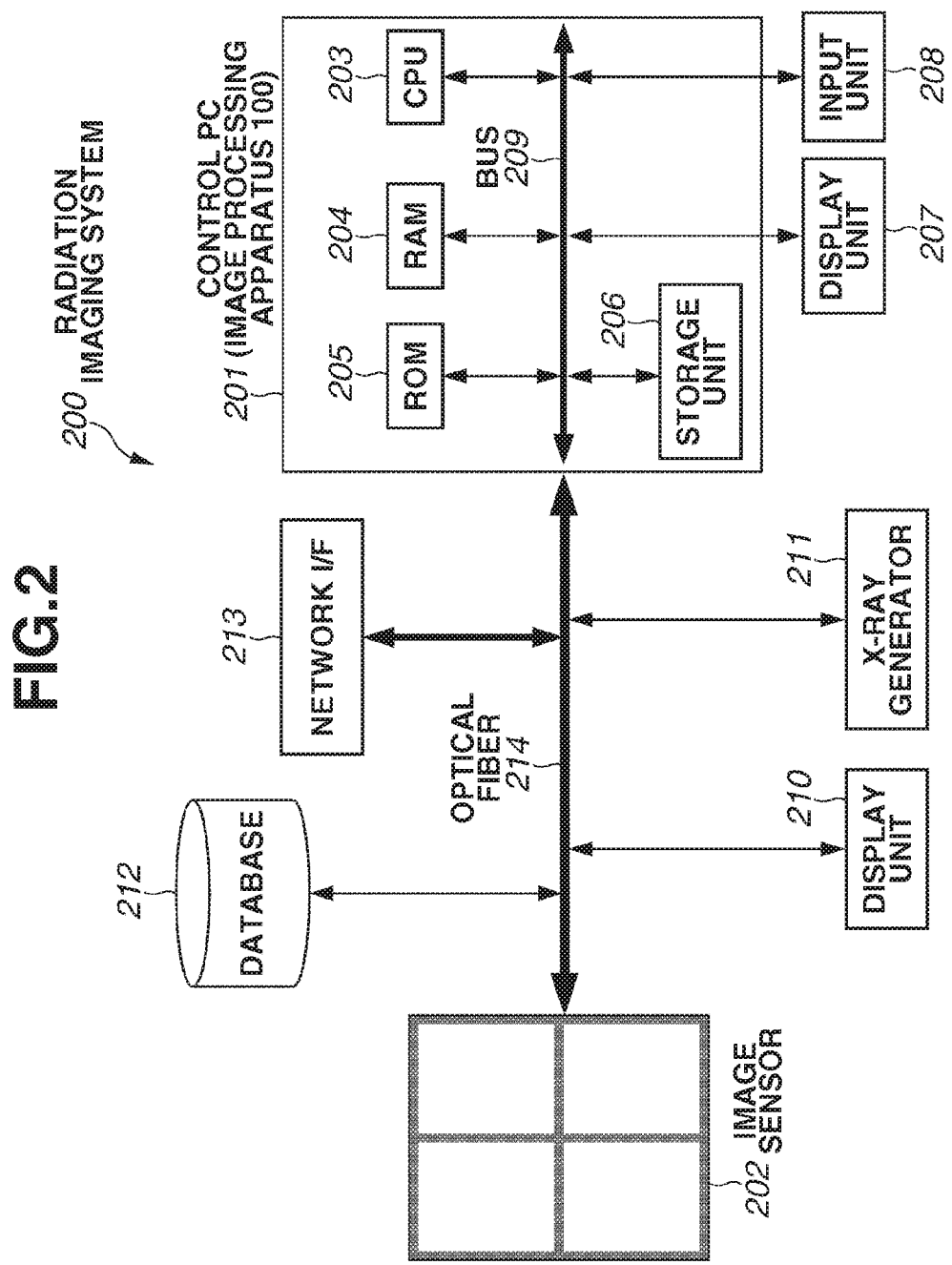
FIG. 2 illustrates a configuration of a radiation imaging system including the image processing apparatus according to the first exemplary embodiment.

FIG. 2 illustrates a hardware configuration in which the image processing apparatus 100 is implemented by hardware and software. A control personal computer (PC) 201 serving as the image processing apparatus 100 includes a central processing unit (CPU) 203, a random access memory (RAM) 204, a read-only memory (ROM) 205, and a storage unit 206. They are connected to one another via a bus 209. Further, a display unit 207 and an input unit 208 are respectively connected to the control PC 201 as external (peripheral) devices. A program for causing the control PC 201 to perform processing illustrated in FIGS. 3A and 3B, described below, is stored as a software module in the ROM 205 or the storage unit 206. This program is read into the RAM 204, and is executed by the CPU 203. The CPU 203 controls each of hardware resources in the control PC 201 in response to a programmed instruction so that each of functions illustrated in FIG. 1 is implemented as a whole. Such a program is stored as a software module for each imaging mode.

FIG. 2 also illustrates a hardware configuration of a radiation imaging system 200 including the image processing apparatus 100. The control PC 201 serving as the image processing apparatus 100, an image sensor 202, and an X-ray generator 211 are connected to one another via an optical fiber 214 serving as a signal line. The signal line may be not only the optical fiber 214 but also a controller area network (CAN) or Gigabit Ethernet. A display unit 210, a database 212, and a network interface unit (I/F) 213 are connected to the optical fiber 214.

The control PC 201 sends commands to the image sensor 202 and the X-ray generator 211 serving as a radiation source. The image sensor 202 includes a phosphor for converting X-rays into light, a semiconductor substrate for converting light emitted by the phosphor into an electrical signal, a driving circuit for reading out the electrical signal, and a circuit for generating digital image data from the read electrical signal. The display unit 210 is mainly used to display a graphic user interface (GUI) for a user to confirm a moving image obtained according to an imaging operation of the X-ray generator 211 in real time. On the other hand, the display unit 207 is mainly used to display a GUI for the user to set an imaging condition. Although the display unit 210 and the display unit 207 are illustrated as separate entities, these may also be implemented as a single unit. Moreover, each the display unit 210 and the display unit 207 may be implemented, for example, by a liquid crystal display (LCD) panel or the like.

In the radiation imaging system 200, a moving image and a still image can be captured. If the moving image is captured, a dose of radiation is controlled based on an output value obtained when the image sensor 202 receives radiation. Thus, a predetermined image quality of an X-ray image output by the image sensor 202 can be retained.

In the control PC 201, the CPU 203 periodically checks the output value from the image sensor 201 to monitor an input dose that reaches a determined range of the image sensor 202 and to control an incident dose so that a value of the input dose becomes constant. The CPU 203 instructs the X-ray generator 211 to increase the incident dose when it is determined that the input dose is less than a reference value. The CPU 203 instructs the X-ray generator 211 to decrease the incident dose when it is determined that the input dose exceeds the reference value. The X-ray generator 211 emits X-rays at an appropriate dose from an X-ray tube in response to the instruction. The dose can be manually controlled via the GUI on the display unit 210, an operation button (not illustrated), or the input unit 208.

In moving image capturing such as fluorography or cineradiography, dose control is automatically performed. When a range used to monitor a dose is not appropriate, the dose is not necessarily an optimum dose. Immediately after the moving image capturing is started or when an imaging area moves, it takes time for feedback control to converge. During that time, an image may be output at an inappropriate dose from the image sensor 202. Even if dose control correctly operates, the dose has an upper limit from the viewpoint of safety. Therefore, X-rays may be unable to be emitted at only a required amount of dose. In this case, an image in which only noise has been emphasized is also output. Accordingly, appropriate correction processing may be necessary to address incorrectly obtained images.

The outline of the processing performed by the image processing apparatus 100 will be described with reference to FIGS. 3A and 3B. FIGS. 3A and 3B illustrate a relationship among a pixel value corresponding to a dose detected by the image sensor 202, a dynamic range in which an output characteristic is good, and a pixel value range in an image generated by the image sensor 202.

FIG. 3A illustrates a dynamic range 300 representing a range in which an output characteristic is good. On the other hand, an image corresponding to a dose (an amount) of received radiation is generated. A range 301 represents a pixel value range in an image. When a histogram for a pixel value in an image is taken, the range 301 is defined by a lower limit and an upper limit of pixel values the number of times of appearance of which is higher than a predetermined threshold value. A setting range 302 represents a pixel value range to be emphasized in an image, which has been set based on pixel values in a region of interest of the image by the setting unit 102.

In the range 301, a part of the setting range 302 is not included within the dynamic range 300. In this case, the gradation conversion curve correction unit 105 shifts the setting range 302 toward a higher pixel value by a range corresponding to the part of the setting range 302 that is not included within the dynamic range 300. Shifting the setting range means changing a lower limit and an upper limit of a pixel value range without changing the size of the pixel value range. A range 303 represents a range corrected by shifting the setting range 302. Thus, an area, which is to be originally emphasized, of an image is not emphasized, and the image is instead the image is apparently reduced or squeezed. Accordingly, an operator viewing the image can be made to intuitively understand that a dose in the image is not appropriate.

Similarly, a range 311 represents a pixel value range in another image or in another region of interest of an image. A setting range 312 represents a pixel value range to be emphasized in the image. In this case, a part of the setting range 312 exceeds the dynamic range 300. The gradation conversion curve correction unit 105 shifts the setting range 312 to be emphasized to a range 313. Thus, an area, closer to a lower pixel value than an area, which is to be originally emphasized, of the image is emphasized. Therefore, an image apparently having a loss of highlight detail can be obtained. Accordingly, the operator viewing the image can be made to intuitively aware that a dose in the image is deficient.

In FIG. 3B, a range 331 represents a pixel value range in an image, and a setting range 332 represents a pixel value range to be emphasized. In this case, the range 331 and the setting range 332 are included within the dynamic range 300. Therefore, the gradation conversion curve correction unit 105 need not correct the range 331 and the setting range 332. In the image, the setting range 332 to be originally emphasized has been emphasized.

A range 341 represents a pixel value range in another image, and a setting range 342 represents a pixel value range to be emphasized. In this case, while a part of the range 341 is not included within the dynamic range 300, the setting range 342 is included therein. In this case, noise and artifacts are not emphasized. In the image, the setting range 342 has been emphasized.

Figure 4:
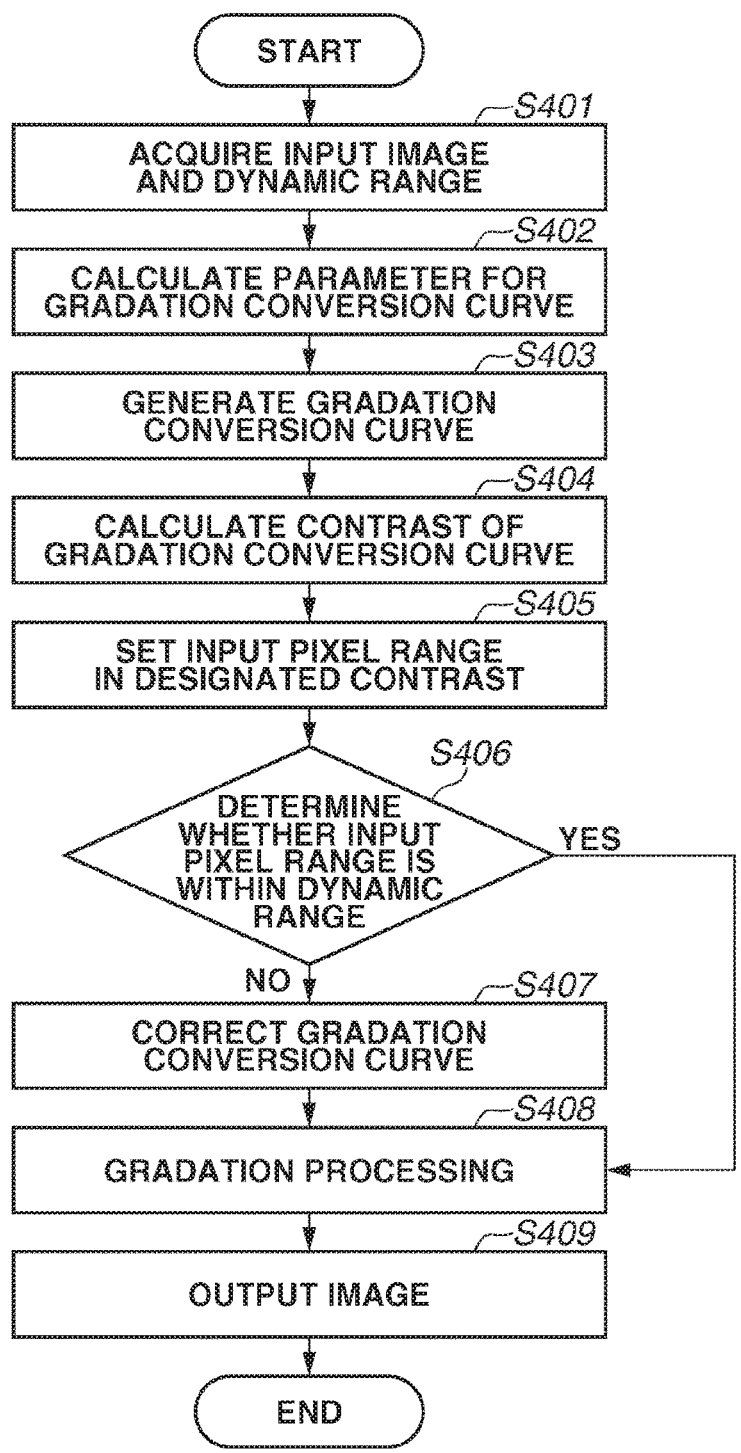
FIG. 4 is a flowchart illustrating the flow of processing according to the first exemplary embodiment.

The flow of processing implemented by the radiation imaging system 200 will be described with reference to FIG. 4. FIG. 4 illustrates the flow of moving image capturing processing performed by the radiation imaging system 200.

As a step preceding step S401, the X-ray generator 211 controls the X-ray tube, to intermittently emit X-rays. A dose of the X-rays to be emitted is monitored by acquiring an output value obtained by receiving the X-rays in a predetermined area of the image sensor 202 at predetermined timing and is controlled by the X-ray generator 211 in response thereto.

The image sensor 202 receives the X-rays and continuously outputs a frame image in synchronization with the emission of the X-rays. A circuit in the image sensor 202 corrects a sensor characteristic for the frame image. The correction of the sensor characteristic includes offset correction, logarithm conversion, gain correction, and defective-pixel correction. The generation of the corrected image and the processing by the image processing apparatus 100 are concurrently performed.

In step S401, information required for image processing is acquired from the external apparatus. The image input unit 101 acquires an original image for which a sensor characteristic has been corrected. The characteristic acquisition unit 103 acquires a value representing a dynamic range of the image sensor 202, which has been previously measured and stored in the storage unit 206.

In steps S402 to S404, the setting unit 102 sets a pixel value range to be emphasized based on the image. In step S402, the image analysis unit 108 analyzes the original image, and calculates a parameter for generating a gradation conversion curve. In the present exemplary embodiment, a method for shifting and using a fixed gradation conversion curve is performed as a gradation processing method. A shift amount is determined so that an optimum luminance is assigned to a region of interest on the original image. The image analysis unit 108 calculates and outputs an average value in the region of interest.

The setting unit 102 functioning as a region of interest (ROI) setting unit sets the region of interest. The region of interest is set to a square area of several inches from the center of the image. This corresponds to the fact that the image may be captured with a focus on a portion that seems to be diagnostically important. The vicinity of the center of the image is set to the region of interest so that a portion to be diagnostically paid attention to can be the region of interest. As another method for setting a region of interest, an appropriate area can be set for each imaging portion by analyzing an image. Ina chest image, for example, a lung field is extracted, and an area of the lung field is set to the region of interest. This technique corresponds to a case where an area to be paid attention to is not necessarily positioned at the center of the image. Such a case includes a case where a plurality of portions of the image is required to be paid attention to depending on an imaging portion and an imaging purpose or a case where an imaging format is previously determined. In response to this, gradation of an image can be set based on a portion to be paid attention to by analyzing the image based on information relating to the imaging portion and setting the region of interest. A further method includes a method for matching a region of interest with the above-mentioned predetermined area used for monitoring a dose to set them in the same area. Thus, an area to be a basis for control of a dose and an area to be a basis for image processing are lined up with each other. Therefore, an image quality can be more appropriately improved.

In step S403, the gradation conversion curve generation unit 109 acquires the average value in the region of interest obtained by the analysis and the external parameter for the gradation conversion curve, and generates a gradation conversion curve (first gradation conversion function). In the present exemplary embodiment, a sigmoid function S (w) of a pixel value w expressed in equation (1) is used as the gradation conversion curve:

$$S(w) = pxS_{min} + (pxS_{max} - pxS_{min}) * (f(w)) \quad (1)$$
$$f(w) = \frac{1}{1 + \exp((sPrmC)(sX_0 - w))}$$

In equation (1), pxSmin and pxSmax are respectively a minimum value and a maximum value of the gradation conversion curve S (w). sPrmC is a slope of the gradation conversion curve S (w), and $sX_0$ is a shift amount in a w direction.

In step S404, the gradation conversion curve generation unit 109 then calculates a differential value S' (w) as a value representing a contrast of the gradation conversion curve S (w). If the differential value S' (w) is a predetermined value or more at an input pixel value, e.g., is larger than 1, the contrast is more greatly emphasized than the original image. On the other hand, if the differential value S' (w) is smaller than 1, a pixel value difference is treated as being smaller than that in the original image so that the contrast is weakened. The gradation conversion curve generation unit 109 sets a pixel value range in which the differential value S' (w) is larger than a predetermined threshold value as a pixel value range to be emphasized in an image. While this threshold value may be set to 1, as described above, it may be a value larger than 1. The threshold value is determined depending on information relating to the image or an imaging region. By processes in steps S402 to S404, the setting unit 102 sets the pixel value range to be emphasized.

In step S405, the determination unit 104 determines whether a designated condition holds between an input value to the gradation conversion curve and the differential value S' (w). As the designated condition, a pixel value range in which noise is dominant is not converted into a high contrast. Even if the high contrast is given to a pixel in which noise is dominant, only the noise is emphasized so that the image becomes an image that has no information and is diagnostically inappropriate. For the purpose of preventing this, in step S406, the determination unit 104 determines whether the pixel value range to be emphasized, which has been set by the setting unit 102, is included within the dynamic range, which is a pixel value range in which an output characteristic of the image sensor 202 is good. If it is determined that the set pixel value range is included within the dynamic range (YES in step S406), noise and artifact are not emphasized in the pixel value range to be emphasized, which has been set based on the region of interest in the image. Then in step S408, the gradation processing unit 106 directly emphasizes the range set by the setting unit 102.

If it is determined that the set pixel value range is not included within the dynamic range (NO in step S406), noise and artifact are emphasized in the pixel value range to be emphasized so that the image becomes unnatural. Further, the operator viewing the image cannot determine whether X-rays are irradiated at an appropriate dose. For example, the image originally becomes dark if X-rays are radiated at a low does. On the other hand, when a contrast in a lower pixel value range in which there is much noise is emphasized, the whole image feels rough. The operator cannot determine whether the dose is to be increased or decreased if the operator finds that X-rays are not radiated at an appropriate dose. Therefore, the control emphasis corresponding to the region of interest is discarded, and the gradation is changed so that the image indicates that X-rays are radiated at a low dose exceeding a reference dose. Therefore, in step S407, the gradation conversion curve correction unit 105 corrects the pixel value range to be emphasized.

Figure 5:
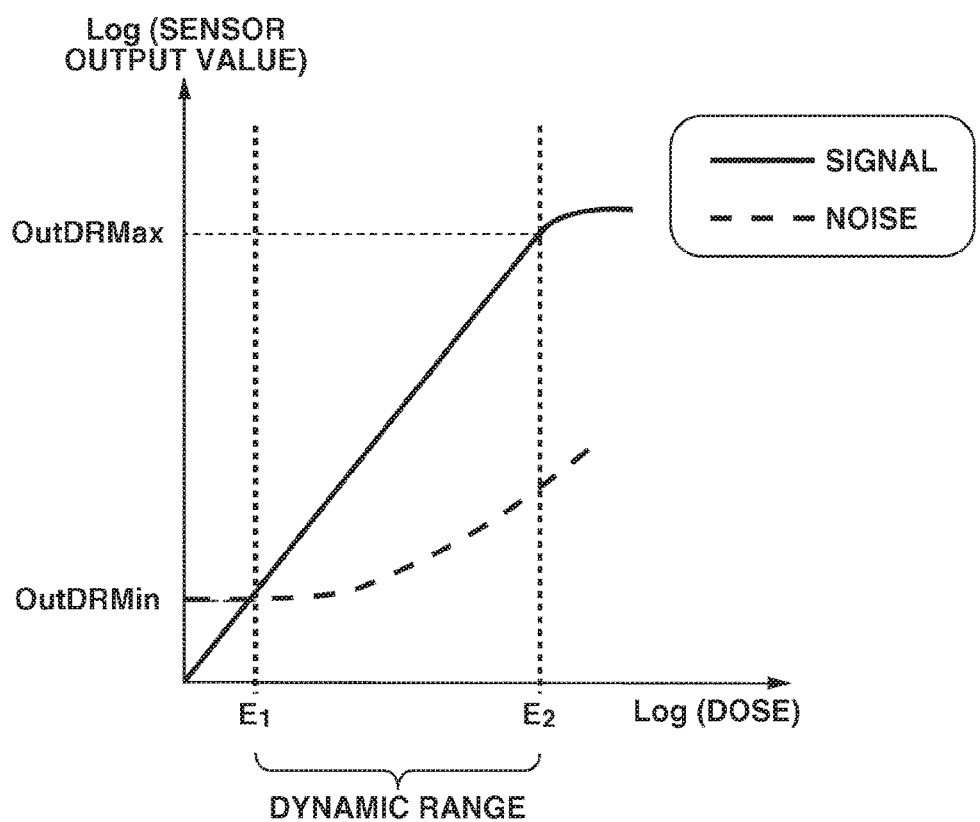
FIG. 5 illustrates a dynamic range of an image sensor according to the first exemplary embodiment.

The determination processing by the determination unit 104 in step S406 and the correction processing by the gradation conversion curve correction unit 105 in step S407 will be described in detail with reference to FIGS. 5 and 6. FIG. 5 illustrates a characteristic of the image sensor 202. The dynamic range of the image sensor 202 will be described with reference to FIG. 5. The horizontal axis represents an input dose that reaches the image sensor 202 (an amount of received radiation), the vertical axis represents a sensor output value, a solid line represents a signal component, and a broken line represents a noise component. An output value of the image sensor 202 becomes a value that is the sum of a signal value and a noise value. While the noise component is more dominant at a dose up to a dose (an amount of received radiation) E1, the signal component is more dominant at the dose E1 and the subsequent doses. The signal component is saturated at a dose (an amount of received radiation) E2. In such a relationship, a range from E1 to E2 is defined as the dynamic range of the image sensor 202.

When qualitatively described, the range from E1 to E2 is a pixel value range or a dose range (an amount of received radiation) at which an output characteristic of the signal value and the noise value of the image sensor 202 is good. In another viewpoint, the range from E1 to E2 is a range in which a signal-to-noise (SN) ratio is higher than a threshold value in the dynamic range. In still another viewpoint, the range from E1 to E2 is a pixel value range at which the signal component is not saturated or linearity of an output of the signal component is kept good.

Sensor output values corresponding to the input doses are respectively OutDRMin and OutDRMax. If the sensor output value is OutDRMin or less, the noise component is dominant. On the other hand, if the sensor output value is OutDRMax or more, the sensor output value is saturated so that artifact specific to the image sensor 202 is generated. Therefore, respective values that are OutDRMin or less and OutDRMax or more are not effective as the sensor output value.

Processing for correcting the gradation conversion curve will be described below with reference to FIGS. 6A and 6B. An input pixel value is a pixel value in an original image obtained by correcting a sensor output value. An input pixel value $W_{E1}$ and an input pixel value $W_{E2}$ respectively correspond to the dose E1 and the dose E2 illustrated in FIG. 5. A range between the input pixel values $W_{E1}$ and $W_{E2}$ is indicated by a gray zone. This corresponds to the dynamic range of the image sensor 202. More specifically, a value effective as the sensor output value can be determined to be only within the gray zone. In step S407, the gradation conversion curve correction unit 105 performs control so that a high-contrast area of the gradation conversion curve falls within this range. The differential value S' (w) in the sigmoid function S (w) changes from a low contrast to a high contrast at a threshold value Th1, and changes from a high contrast to a low contrast at a threshold value Th2. Input pixel values $W_{th1}$ and $W_{th2}$ respectively correspond to the threshold values Th1 and Th2. This range is an area to be emphasized in the image.

The determination unit 104 determines whether a range defined by the two threshold values $W_{th1}$ and $W_{th2}$ is included within a range from the input pixel value $W_{E1}$ to the input pixel value $W_{E2}$. If it is determined that the defined range is not included within the range from $W_{E1}$ to $W_{E2}$, the gradation conversion curve is corrected as expressed in equation (2). This processing is used to shift the gradation conversion curve toward a lower pixel value.

If $S'(w_{E1}) > Th_1$ $S_{new}(w) = S(w - (e_{E1} - w_{th1}))$

If $S'(w_{E2}) > Th_2$ $$S_{new}(w) = S(w - (w_{E2} - w_{th2})) \quad (2)$$

If the threshold value $W_{th1}$ is the input pixel value $W_{E1}$ or less, as illustrated in FIG. 6A, only noise is emphasized. Therefore, the gradation conversion curve is shifted toward a higher dose area (a higher pixel value). On the other hand, if the threshold value $W_{th2}$ is the input pixel value $W_{E2}$ or more, as illustrated in FIG. 6B, only artifact specific to the image sensor 202 is emphasized. Therefore, the gradation conversion curve is shifted toward a lower dose area (a lower pixel value).

The gradation conversion curve correction unit 105 determines a shift amount so that a pixel value range to be emphasized is included within the dynamic range. The gradation conversion curve is shifted so that the pixel value range to be emphasized is just barely included within the dynamic range. If the pixel value range closer to the lower pixel value than the dynamic range is emphasized, the shift amount is determined so that a lower limit of the range to be emphasized matches a lower limit of the dynamic range. Thus, the shift amount is minimized so that ease of viewing the image can be kept as much as possible.

By the foregoing processing, the pixel value range to be emphasized is also corrected in response to the gradation conversion curve being corrected. If the range to be emphasized is not included within the dynamic range, processing for shifting the range to be emphasized is thus performed.

If the dynamic range of the image is sufficiently large, the emphasis of the noise or the like may be unable to be prevented only by shifting the pixel value range. The pixel value range is shifted by giving priority to falling within a pixel value range in which an SN ratio is higher than its threshold value, rather than falling within a pixel value range in which linearity in signal output is good. Thus, the pixel value range to be emphasized is shifted toward the higher pixel value so that the image has a loss of highlight detail. Therefore, the does can be prevented from being manually set high.

In step S408 illustrated in FIG. 4, the gradation processing unit 106 subjects the original image to gradation conversion. If the whole of the pixel value range, which has been set by the setting unit 102, is included within the dynamic range, the gradation conversion curve S(w) (the first gradation conversion function) for emphasizing the set pixel value range is applied to the image. On the other hand, if a part of the pixel value range is not included within the dynamic range, a gradation conversion curve Snew(w) (a second gradation conversion function) for shifting the pixel value range so that the whole thereof is included within the dynamic range is applied to the image.

If a particular two-dimensional area is determined in the original image, only the particular area is converted by the gradation conversion curve Snew(w), and an area other than the particular area is converted by the gradation conversion curve S(w). Thus, only the particular area is displayed as a partial image in which noise and artifact are not emphasized and a dose is clearly excessive or deficient.

In step S409, the display control unit 107 displays the image, which has been subjected to gradation conversion, on the display unit 210. Further, the display control unit 107 subjects the image to another image processing such as memory storage or picture archiving and communication system (PACS) transfer, and provides the image to the user.

By the above-mentioned processing, an image in which only noise has been emphasized because an imaging dose is deficient is changed into an image in which noise is not emphasized. Therefore, a dark image in which a dose is clearly deficient is output. An image in which artifact due to a sensor characteristic has been emphasized because an imaging dose is excessive is changed into an image in which a sensor characteristic is not emphasized. Therefore, a bright image in which a dose is clearly excessive is output. If an improvement in an image quality by the image processing cannot be expected because the dose is deficient or excessive, the image is subjected to image processing indicating that the dose is deficient or excessive. Thus, a situation where an unnatural image in which noise and artifact have been emphasized is output can be reduced. It is quite apparent whether the dose is deficient or excessive when the operator views the image. Therefore, the dose can be appropriately controlled.

If the dose is clearly deficient in the image based on information such as a pixel value in a region of interest, the characteristic acquisition unit 103 acquires only the lower limit E1 or the input pixel value $W_{E1}$ as information relating to the dynamic range. In this case, the information relating to the dynamic range includes information representing a pixel value range in which an SN ratio is higher than its threshold value.

Other examples include a case where a dynamic range of the image sensor 202 is sufficiently wide and a case where a range in which linearity is kept is sufficiently wide for output of a signal component of the image sensor 202. In this case, the characteristic acquisition unit 103 may also acquire only the lower limit E1 or the input pixel value $W_{E1}$ as the information relating to the dynamic range.

In a second exemplary embodiment, in order to perform correction so that a pixel value range to be emphasized is included within a dynamic range, a gradation conversion curve is changed in slope instead of being shifted. A hardware configuration of the second exemplary embodiment is substantially similar to that of the first exemplary embodiment. However, the second exemplary embodiment differs from the first exemplary embodiment in processing performed by the gradation conversion curve correction unit 105. The second exemplary embodiment will be described with reference to FIG. 7.

Figure 7:
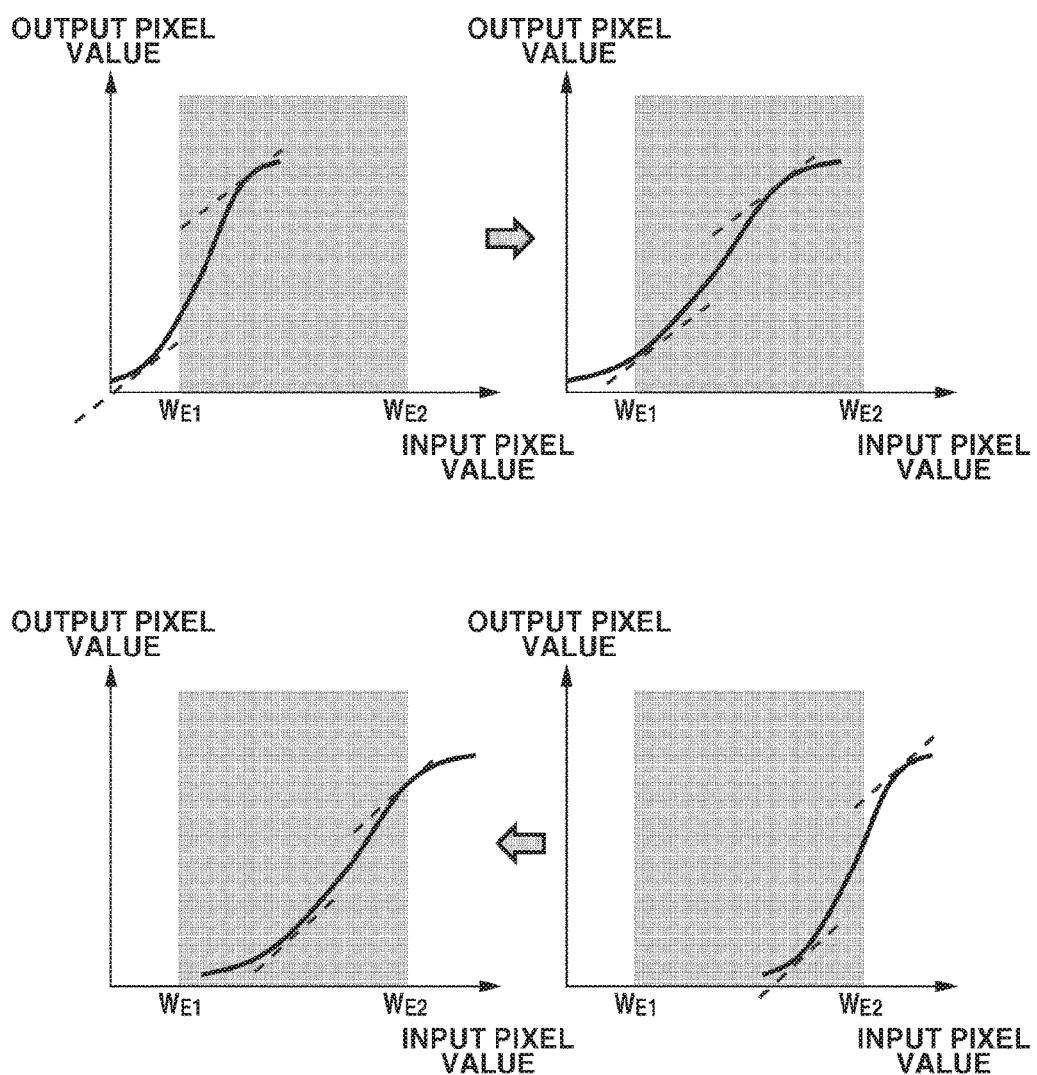
FIG. 7 illustrates examples of correction of a gradation conversion curve according to a second exemplary embodiment of the present invention.

The flow of processing in the second exemplary embodiment will be described based on the configuration diagram of FIG. 1 and the whole flow illustrated in FIG. 4. Steps S401 to S405 are similar to those in the first exemplary embodiment, and hence a description thereof is not repeated. FIG. 7 illustrates conversion in a gradation conversion curve. An input pixel value is obtained by correcting a sensor output value. An input pixel value $W_{E1}$ and an input pixel value $W_{E2}$ respectively correspond to a dose E1 and a dose E2 illustrated in FIG. 5. A range between the input pixel values $W_{E1}$ and $W_{E2}$ is indicated by a gray zone. More specifically, a value effective as the sensor output value can be determined to be only within the gray zone. In step S406, the gradation conversion curve correction unit 105 performs control so that a high-contrast area of the gradation conversion curve falls within this range. A differential value S'(w) in a gradation conversion curve S (w) changes between a low contrast and a high contrast at threshold values Th1 and Th2. Control can be performed by setting slopes of the gradation conversion curve S (w) to sPrmCth1 and sPrmCth2 so that slopes at the input pixel values $W_{E1}$ and $W_{E2}$ become the threshold values Th1 and Th2. More specifically, f(w) constituting the gradation conversion curve S(w) is corrected as expressed in equation (3):

$$\text{If } S'(w_{E1}) > Th_1 \qquad (3)$$
$$f_{new}(w) = \frac{1}{1 + \exp((sPrmCth_1)(sX_0 - w))}$$
$$\text{If } S'(w_{E2}) > Th_2$$
$$f_{new}(w) = \frac{1}{1 + \exp((sPrmCth_2)(sX_0 - w))}$$

If a contrast at the input pixel value $W_{E1}$ is high, as illustrated in FIG. 7, only noise is emphasized. Therefore, the slope of the gradation conversion curve S(w) is decreased. On the other hand, if a contrast at the input pixel value $W_{E2}$ is high, only artifact specific to the image sensor 202 is emphasized. Therefore, the slope of the gradation conversion curve S(w) is decreased. While the gradation conversion curve S(w) is changed in slope uniformly for all input pixels in equation (3), the gradation conversion curve S(w) may be converted into a gradation conversion curve that differs in slope at its center. Step S408 and the subsequent steps are similar to those in the first exemplary embodiment, and hence a description thereof is not repeated.

As another example, when the gradation conversion curve S(w) does not fall within a range of input pixel values $W_{th1}$ and $W_{th2}$ corresponding to the threshold values Th1 and Th2, the gradation conversion curve S(w) is compressed (or the input pixel value is compressed) into the ranges of input pixel values $W_{th1}$ and $W_{th2}$.

Even if the gradation conversion curve S(w) is not only shifted but also is changed in slope and compressed in a pixel value direction, an unnatural image in which noise and artifact have been emphasized can be prevented from being output.

A third exemplary embodiment has a function of switching whether to perform contrast emphasis processing according to dose control. While a hardware configuration of the third exemplary embodiment is substantially similar to that of the first exemplary embodiment, the third exemplary embodiment differs from the first exemplary embodiment in that the gradation processing unit 106 performs processing in response to input to a GUI displayed on the display unit 207. The present exemplary embodiment will be described with reference to FIGS. 8 to 10.

Figure 8:
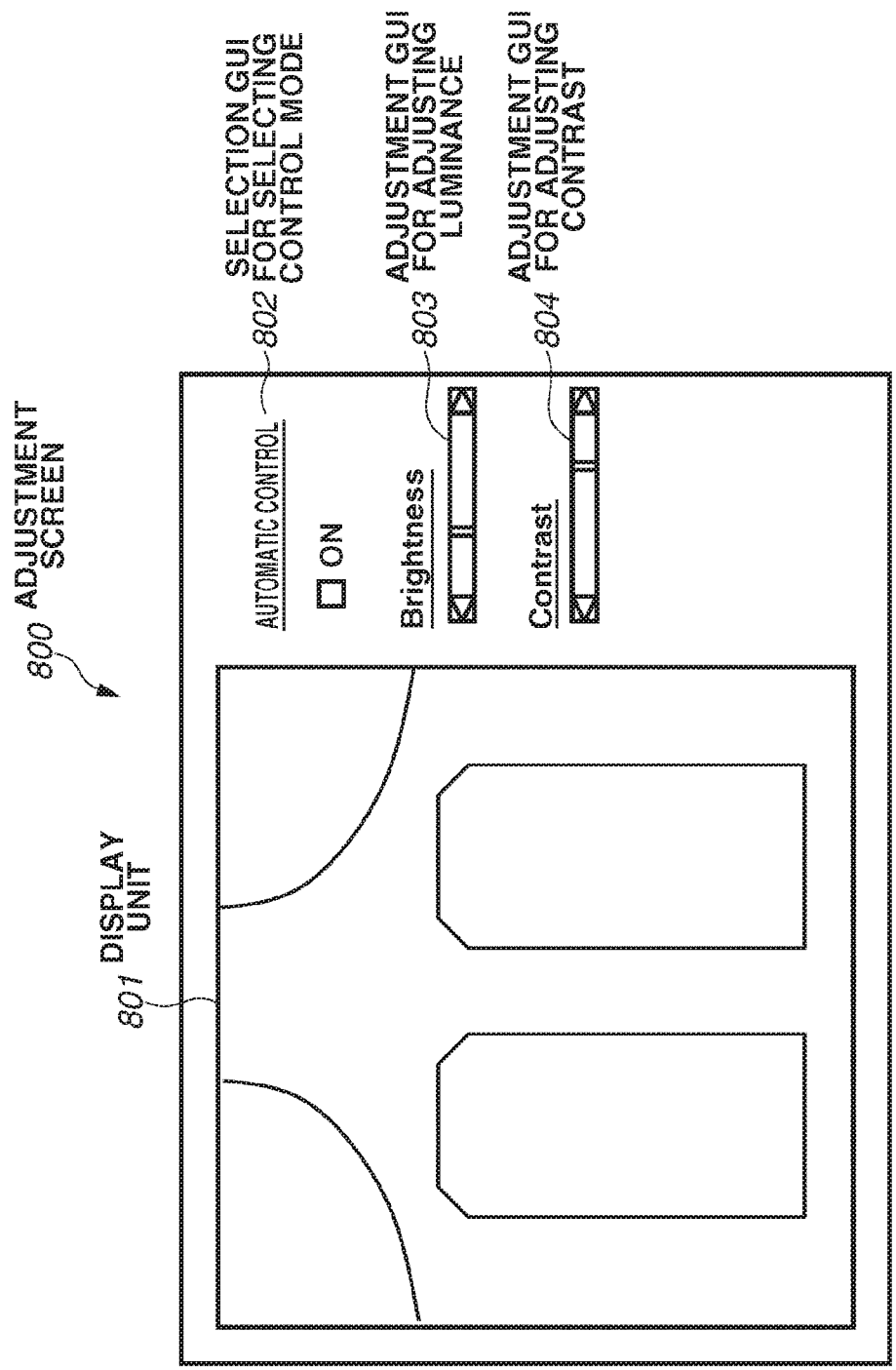
FIG. 8 illustrates an adjustment screen displayed on a display unit according to a third exemplary embodiment of the present invention.
Figure 9:
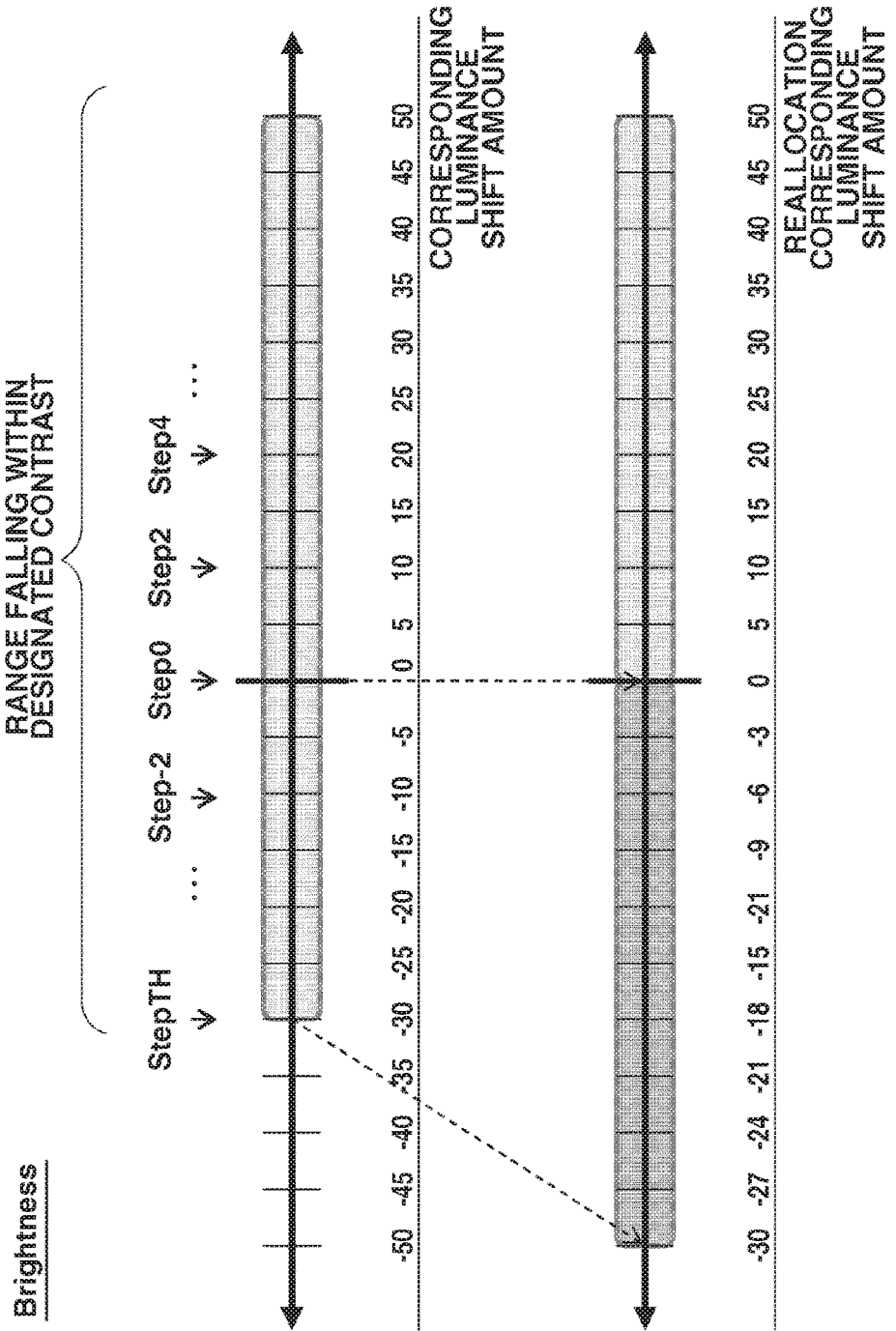
FIG. 9 illustrates a graphical user interface (GUI) adjustment step according to the third exemplary embodiment.

An adjustment screen 800 for obtaining input from a user will be described with reference to FIG. 8. A selection GUI 802 for controlling a control mode includes a checkbox for the GUI, as illustrated in FIG. 8, for example. The determination unit 104 selects whether to perform the image processing described in the above-mentioned exemplary embodiments according to selection in the selection GUI 802. When a user turns the checkbox on, the image processing illustrated in the flowchart of FIG. 4 is performed. On the other hand, if the user turns the checkbox off, the image processing illustrated in the flowchart of FIG. 4 is not performed. An adjustment GUI 803 for adjusting a luminance includes a GUI, as illustrated in FIG. 8, for the user to adjust the luminance. The gradation conversion curve correction unit 105 shifts a gradation conversion curve in response to input to the adjustment GUI 803. An adjustment GUI 804 for adjusting a contrast includes a GUI, as illustrated in FIG. 9, for the user to adjust the contrast. The gradation conversion curve correction unit 105 changes the gradation conversion curve in response to input to the adjustment GUI 804 so that the contrast is adjusted.

Details of the adjustment GUI 803 will be described with reference to FIG. 9. In the adjustment GUI 803, Step0, Step2, Step-2, Step4, . . . , StepTH are displayed from a position closer to the center (Step0) as luminance adjustment steps, as illustrated in FIG. 9. 0, 5, −5, 10, −10, . . . , are displayed by five from the position closer to the center to match the luminance adjustment steps as luminance shift amounts. For example, the luminance adjustment step Step2 corresponds to the luminance shift amount 10, and the luminance adjustment step StepTH corresponds to the luminance shift amount −30. When the user selects the luminance adjustment step, the gradation conversion curve correction unit 105 shifts the gradation conversion curve by the corresponding luminance shift amount so that a luminance is adjusted.

In the adjustment GUI 803, the gradation conversion curve does not fall within a designated contrast range when the luminance exceeds the luminance adjustment step StepTH. If the luminance is changed to be larger (in absolute value) than the luminance adjustment step StepTH, an image that is diagnostically improper is generated.

If any luminance adjustment step is selected, the display control unit 107 reallocates the luminance shift amounts and the luminance adjustment steps to reduce a minimum unit of the luminance shift amounts. A lower stage in FIG. 9 illustrates reallocation when the luminance adjustment step Step0 is selected. In FIG. 9, the gradation conversion curve exceeds the designated contrast range when the luminance is changed in a negative direction. Therefore, the luminance shift amounts are allocated by three to the luminance adjustment steps from StepTH to Step0. As a result, detailed adjustment can be made between the luminance adjustment steps StepTH and Step0. The contrast adjustment GUI 804 can use a similar adjustment mechanism.

Figure 10:
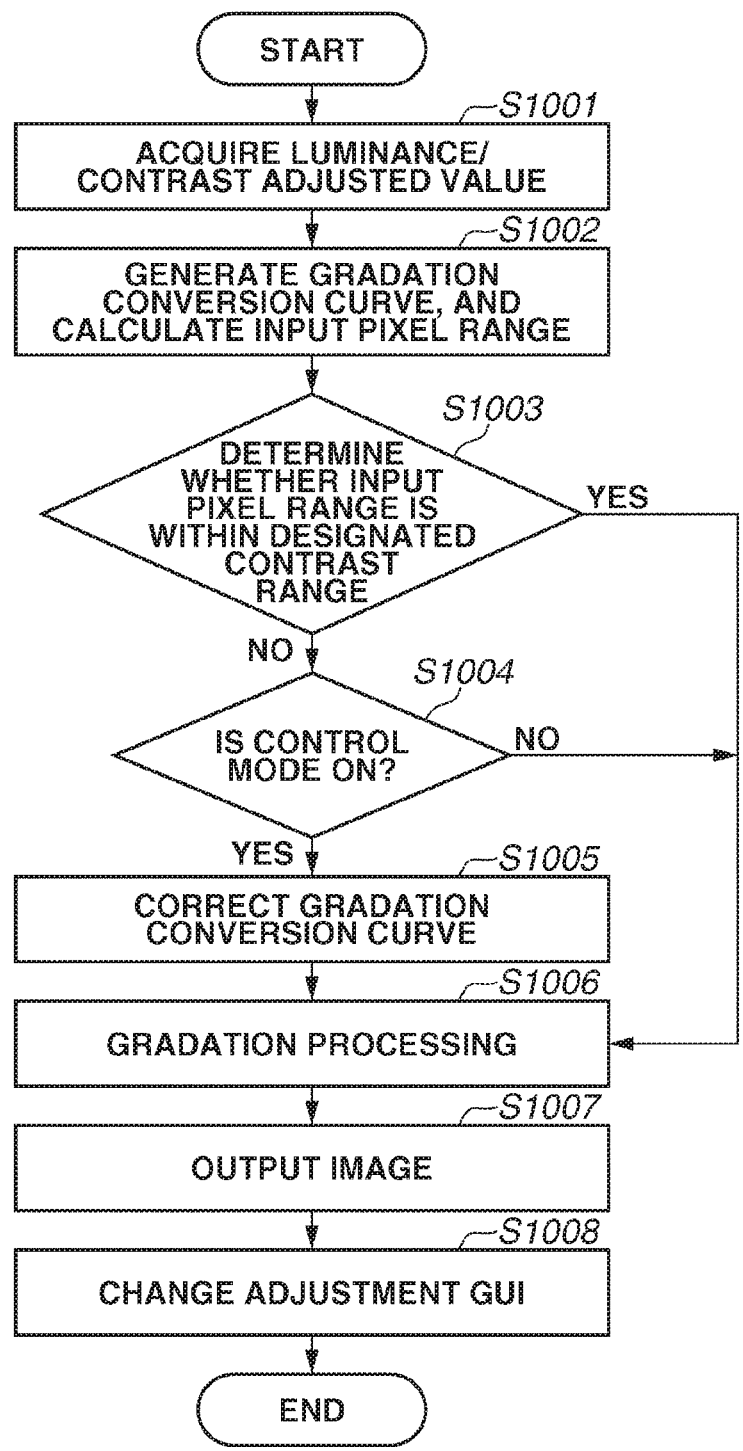
FIG. 10 is a flowchart illustrating the flow of processing according to the third exemplary embodiment.

The flow of processing performed by the image processing apparatus 100 when the above-mentioned adjustment function is used will be described with reference to the flowchart of FIG. 10. In step S1001, the gradation conversion curve generation unit 109 first acquires an amount that has been luminance/contrast adjusted by a user. In step S1002, the gradation conversion curve generation unit 109 updates a gradation conversion curve using the acquired luminance adjusted amount. In step S1003, the determination unit 104 calculates a pixel value outside a dynamic range of the image sensor 202, and determines whether the pixel value is within a designated contrast range. This processing is similar to those in the above-mentioned exemplary embodiments. If it is determined that the pixel value is within the designated contrast range (YES in step S1003), the processing proceeds to step S1006. On the other hand, if it is determined that the pixel value is not within the designated contrast range (NO in step S1003), the processing proceeds to step S1004. In step S1004, the determination unit 104 determines whether a current gradation control mode is ON or OFF. In the determination, when the selection GUI 802 for selecting the adjustment screen control mode is ON, an input pixel value outside the dynamic range of the image sensor 202 is controlled to be within the designated contrast range if it exceeds the designated contrast range. In step S1005, the gradation conversion curve correction unit 105 corrects the gradation conversion curve, like in the first and second exemplary embodiments. When the selection GUI 802 is OFF, the input pixel value is not controlled. More specifically, in step S1006, the gradation processing unit 106 performs processing using the gradation conversion curve generated in step S1002. In step S1007, the display control unit 107 displays an image, which has already been subjected to gradation processing, on the image display GUI 801. In step S1008, the display control unit 107 reallocates luminance shift amounts and luminance adjustment steps in the adjustment GUIs 803 and 804, as illustrated in FIG. 9.

As described above, according to the present exemplary embodiment, whether to perform contrast emphasis processing corresponding to the dynamic range of the image sensor 202 can be selected, and can be adjusted by the user. Thus, an image can be subjected to appropriate image processing.

In a fourth exemplary embodiment, if it is determined that a pixel value range to be emphasized is not included within a dynamic range in the above-mentioned exemplary embodiments, the display control unit 107 displays a warning on the display unit 210. Description of overlaps in system configuration and processing flow with the above-mentioned exemplary embodiments is not repeated.

If the determination unit 104 determines that a pixel value range to be emphasized in an image set based on a region of interest is not included within the dynamic range, a warning that appropriate gradation conversion is not performed is displayed.

If a pixel value range set by the setting unit 102 includes a range closer to a lower pixel value than the dynamic range, a warning that a dose is deficient is displayed. This display may be a notification "a dose is deficient" with character information and/or an icon indicating that a dose is deficient. An image, which has been processed in the gradation processing unit 106 by the processing illustrated in the first exemplary embodiment, is displayed side by side with the warning on the display unit 210. This image has been subjected to gradation conversion in which a dose is clearly deficient if the range set by the setting unit 102 is outside the dynamic range. Therefore, a deficiency of a dose can be presented to the user in an easy-to-understand manner with both an X-ray image and character information and/or an icon.

Similarly, if the pixel value range set by the setting unit 102 includes a range closer to a higher pixel value than the dynamic range, a warning that a dose is excessive is displayed. In this case, an image in which it is emphasized that the dose is excessive and the warning are displayed side by side. Therefore, an excess of a dose can be presented to the user in an easy-to-understand manner.

If the pixel value outside the dynamic range of the image sensor 202 is not included within the designated contrast range in the process in step S1003 in the third exemplary embodiment, a warning that a dose is deficient or a dose is excessive may be given. A message for causing the user to select whether to perform processing without correcting a gradation conversion curve may be displayed. Alternatively, display may be performed only by giving the warning.

As another example, the present exemplary embodiment is applicable to a method for supporting manual dose control. When a moving image is captured, the image capturing is first started at a low dose outside the dynamic range. In this case, an image in which a dose is clearly deficient and a warning that the dose is deficient are displayed on the display unit 210. Therefore, an operator gradually raises the dose and adjusts the dose to a dose that is as low as possible to be just barely included within the dynamic range. The operator finishes changing the dose when the dose becomes appropriate. Particularly, in radiation imaging, there is a request to image radiation at a dose that is as low as possible to suppress exposure of a subject. In the present exemplary embodiment, manual dose control can be supported.

Figure 11:
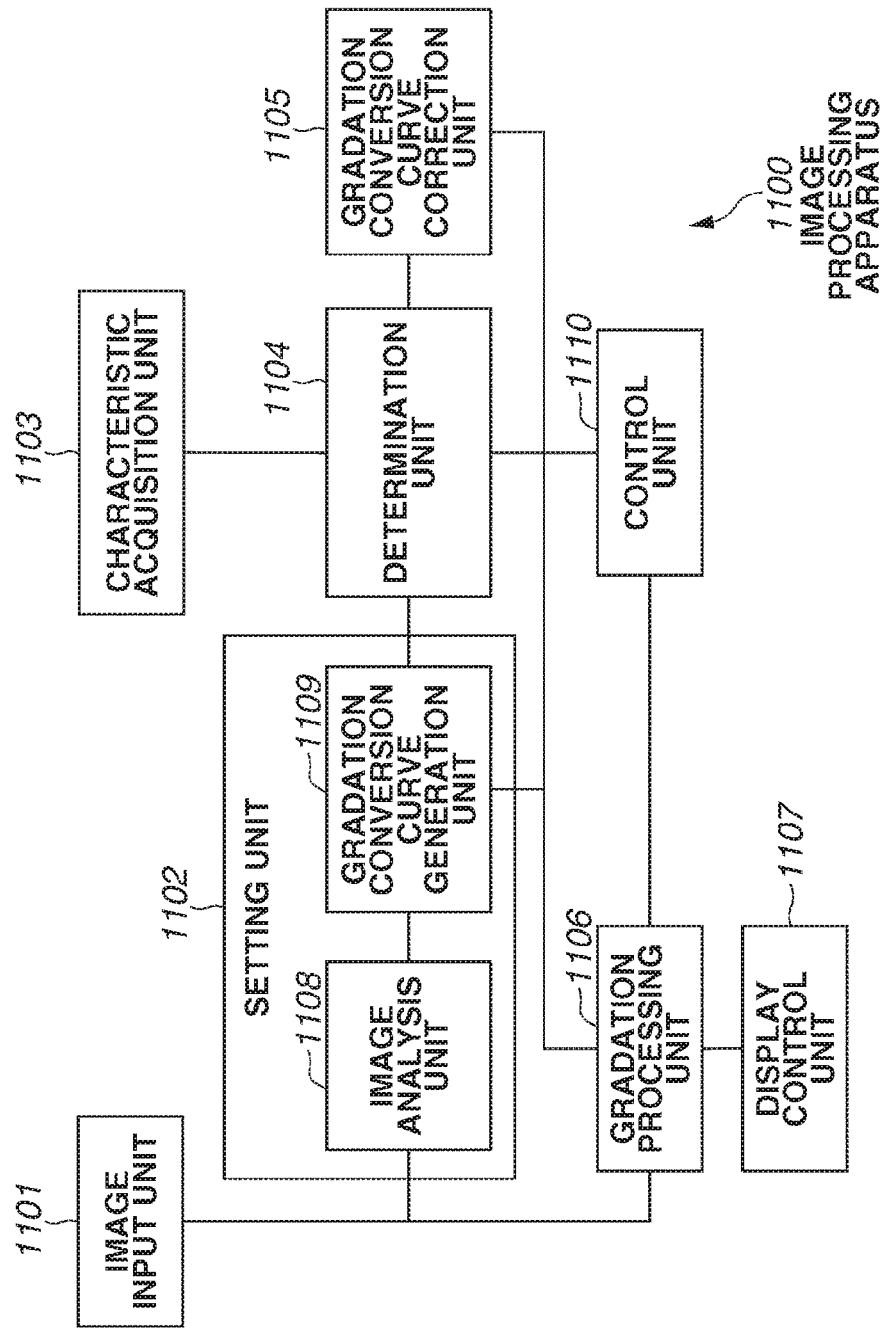
FIG. 11 illustrates a configuration of an image processing apparatus according to a fifth exemplary embodiment of the present invention.

While in the above-mentioned exemplary embodiments, processing for emphasizing a contrast is also performed in a case where a range to be emphasized is outside a dynamic range of the image sensor 202, the emphasis processing is omitted according to a fifth exemplary embodiment. The fifth exemplary embodiment will be described with reference to FIG. 11. In FIG. 11, blocks given similar names to those illustrated in FIG. 1 are similar to those illustrated in FIG. 1, and hence a description thereof is not repeated. A system including an image processing apparatus 1100 is similar to that illustrated in FIG. 2, and hence a description thereof is not repeated.

A control unit 1110 in the image processing apparatus 1100 acquires a determination result by a determination unit 1104. The control unit 1110 controls determination as to whether a gradation processing unit 1106 is made to perform processing. The control unit 1110 sends a predetermined signal to the gradation processing unit 1106 when a set range in which a contrast is emphasized is not included within the dynamic range of the image sensor 202. On the other hand, the control unit 1110 performs control not to send the predetermined signal when the range in which the contrast is emphasized is not included within the dynamic range of the image sensor 202. If the predetermined signal is input, the gradation processing unit 1106 sends an input image to a display control unit 1107 without subjecting the image to gradation conversion. If the predetermined signal is not input, the gradation processing unit 1106 performs processing for emphasizing the contrast in the set range, like in the above-mentioned exemplary embodiments. The image input to the gradation processing unit 1106 is thus input to the display control unit 1107 without being subjected to contrast emphasis processing, and is displayed on the display unit 207.

If a dose of the image is deficient or is excessive, the image is not thus subjected to contrast emphasis processing. Thus, information indicating whether a dose is deficient or excessive can be intuitively confirmed with an operator of the system from the image. The operator of the system can make responses such as adjustment of the dose, switching of a gain in the image sensor 202, or stop of image capturing, as needed.

In a sixth exemplary embodiment, a gradation conversion characteristic is directly determined from an image without obtaining the second gradation conversion characteristic processing by correcting the first gradation conversion characteristic previously generated.

Figure 12:
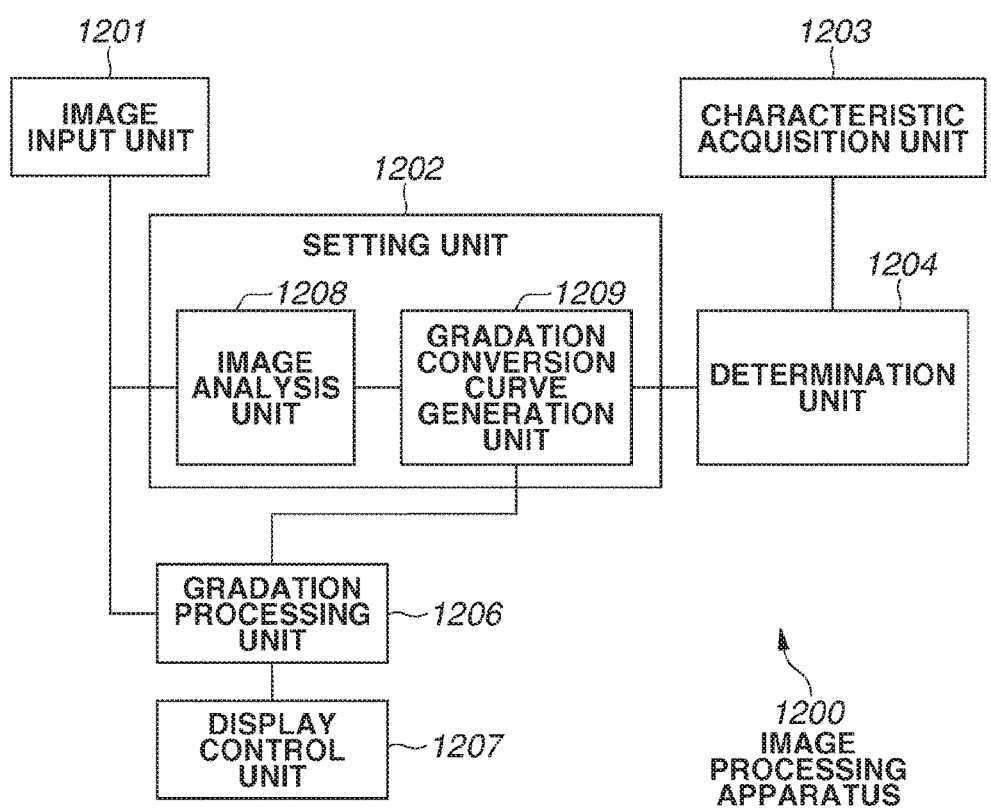
FIG. 12 illustrates a configuration of an image processing apparatus according to a sixth exemplary embodiment of the present invention.

FIG. 12 illustrates a configuration of an image processing apparatus 1200. An image input unit 1201, a gradation processing unit 1206, and a display control unit 1207 are similar to those in the above-mentioned exemplary embodiments. Hardware illustrated in FIG. 2 and a software program stored in the ROM 205 or the storage unit 206 cooperate to implement functions of units. A difference from the above-mentioned exemplary embodiments will be described below.

In the present exemplary embodiment, an image analysis unit 1208 analyzes an X-ray image to acquire a reference pixel value for determining a gradation conversion characteristic. An example of the reference pixel value uses a statistical value such as an average value or a median value in a subject area. The subject area is obtained when the image analysis unit 1208 extracts the subject area with a well-known algorithm from the X-ray image. Gradation conversion can be performed based on the subject area so that an image in which the subject area is easily diagnosed can be obtained.

As another example, a statistical value within a partial area including an image center may be used. X-ray imaging may be performed after a subject is positioned from a point of view of preventing an imaging failure so that a diagnostically important area may be located in the vicinity of the center of the image. This example uses this, which eliminates the need for object extraction processing, and therefore enables a load in analysis processing to be reduced.

The storage unit 206 stores a dynamic range previously acquired at timing before shipment of the image sensor 202. A characteristic acquisition unit 1203 for acquiring the dynamic range may be provided in response to a characteristic change or the like. In this case, the characteristic acquisition unit 1203 acquires a pixel value range corresponding to a dose at which an SN ratio is higher than its threshold value for an image obtained from the image sensor 202, and stores the pixel value range in the storage unit 206. As information relating to the dynamic range, a pixel value range in which the SN ratio is higher than its threshold value in the image obtained by the image sensor 202, as illustrated in FIG. 5, previously described, and in which linearity of an output of a signal component is kept may be stored in the storage unit 206. The pixel value range can be obtained by measuring an SN ratio and a change of an output pixel value with respect to an incident dose that has reached the image sensor 202 for an image obtained by capturing a phantom in which the dose transmittance spatially changes according to a predetermined rule, for example.

The determination unit 1204 determines whether the reference pixel value for gradation conversion obtained by the image analysis unit 1208 is included within the dynamic range stored in the storage unit 206. If the reference pixel value is included within the dynamic range, a gradation conversion curve generation unit 1209 functioning as a determination unit determines a gradation conversion characteristic based on the reference pixel value obtained by the image analysis unit 1208. In this case, the center of a pixel value range in which gradation is widened by the gradation conversion is the reference pixel value obtained by the image analysis unit 1208.

If the determination unit 1204 does not determine that the reference pixel value obtained by the image analysis unit 1208 is included in the stored pixel value range, the gradation conversion curve generation unit 1209 selects a particular pixel value included within the dynamic range as a new reference pixel value. A gradation conversion characteristic is determined so that the new reference pixel value becomes the center of the pixel value range in which the gradation is widened by the gradation conversion.

Figure 14A:
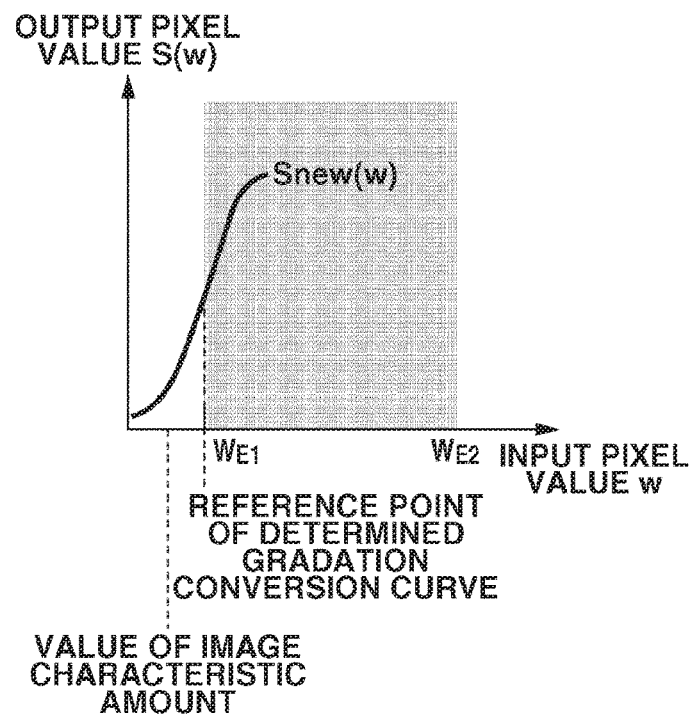
FIGS. 14A and 14B illustrate examples of a gradation conversion characteristic obtained by the image processing apparatus according to the sixth exemplary embodiment.

An example of processing implemented by the above-mentioned functions will be described with reference to FIGS. 13A and 13B and FIGS. 14A and 14B. FIGS. 13A and 13B illustrate processing according to the present exemplary embodiment. A range 1301 represents a pixel value range in an X-ray image. The range 1301 is larger than a dynamic range 300 because X-rays may directly reach the image sensor 202 without passing through a subject in the X-ray image. A value of an image characteristic amount is a reference pixel value for gradation conversion obtained based on a subject area, for example. Particularly when imaging is performed at a low dose, a value of the image characteristic amount may be below the dynamic range 300. In that case, a reference point of the gradation conversion curve is a particular pixel value included within the dynamic range 300. The reference point is a center position in a pixel value range in which gradation is widened by the gradation conversion curve. In an example illustrated in FIG. 13A, a particular pixel value is a lower limit of the dynamic range 300. FIG. 14A is an example of a gradation conversion curve determined by the processing illustrated in FIG. 13A. The present exemplary embodiment is not limited to this. A pixel value that is larger than the lower limit of the dynamic range 300 by a predetermined pixel value may be a reference value. By the above-mentioned processing, noise can be more suppressed than that when the gradation conversion curve determined based on the value of the image characteristic amount is used.

Figure 14B:
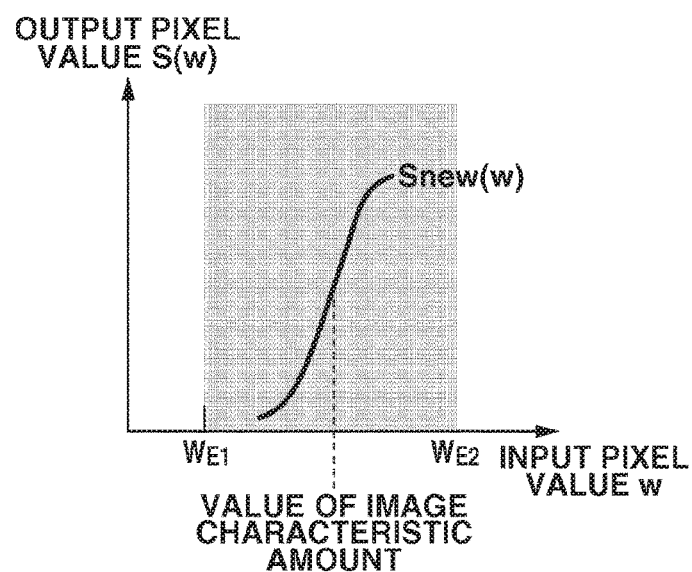

FIG. 13B illustrates a case where the value of the image characteristic amount is included within the dynamic range 300. In this case, the value of the image characteristic amount directly becomes a basis for gradation conversion. In this case, gradation in a subject area is appropriately widened so that an image that is easily diagnosed can be provided. FIG. 14B illustrates an example of a gradation conversion curve corresponding to the case illustrated in FIG. 13B.

By the processing in the present exemplary embodiment, gradation processing that reflects the subject area can be performed. If imaging is performed at a dose below an appropriate dose, noise suppression is given priority to, to narrow gradation in at least a part of the subject area. Thus, an image in which noise is unnaturally emphasized can be prevented from being displayed.

While the pixel value range to be emphasized is set with the gradation conversion curve in the present exemplary embodiment, the setting may be performed with an LUT, or may be performed without performing gradation conversion using a gradation conversion curve or an LUT.

Contrast change processing for suppressing a pixel value range in which an output characteristic of the image sensor 202 is good may be previously performed. If the pixel value range to be emphasized, which has been set based on a pixel value range in a region of interest, includes an area closer to a lower dose than the pixel value range in which the output characteristic of the image sensor 202 is good, a contrast is suppressed in an area excluding a direct exposure area, so that an image enabling an operator to easily find that the image is captured at a low dose can be generated.

Processing performed by the image processing apparatus 100, 1100, or 1200 may be distributed among a plurality of apparatuses and implemented as an image processing system. Processes, which are collected as one functional block illustrated in FIG. 1, FIG. 11, or FIG. 12, may be distributed among a plurality of circuits or functional blocks and implemented. A flat panel detector (FPD) or an imaging apparatus that incorporates functions of an image processing apparatus and a display device in the above-mentioned exemplary embodiments may implement the system according to the present exemplary embodiment.

If the present exemplary embodiment is implemented by cooperation between hardware and software of a computer, as illustrated in FIG. 2, the present exemplary embodiment may be implemented by being distributed among a plurality of CPUs. An operating system (OS) that operates on the computer may perform a part or the whole of actual processing, and the above-mentioned functions may be implemented by the processing. A storage medium on which a program or a program code serving as software is stored also constitutes the present exemplary embodiment. The storage medium is non-transitory, and is a concept not including a medium in which a recording object is not fixed, such as a radio wave, but including a cache, a volatile memory, or the like.

In the above-mentioned exemplary embodiment, noise can be suppressed for an X-ray image obtained when a dose of X-rays to be radiated onto a subject is a dose by narrowing a gradation in a subject area in the X-ray image. Gradation processing, which gives priority to suppressing noise, rather than widening the gradation in the subject area, is thus performed so that an image in which noise has been unnaturally emphasized can be prevented from being displayed.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. An image processing apparatus comprising:
a memory storing a program; and
one or more processors which, by executing the program, function as:
an acquisition unit configured to acquire a gradation conversion characteristic;
a characteristic acquisition unit configured to acquire an input-output characteristic of an X-ray sensor and identify, according to the input-output characteristic, a dynamic range of the X-ray sensor in which a signal-to-noise ratio of an image obtained by the X-ray sensor is higher than a threshold value and in which linearity of an output of a signal component of the image is kept;
an image input unit configured to receive an input image;
an image analysis unit configured to determine a pixel value range to be emphasized in the input image, the pixel value range being set according to a slope of the gradation conversion characteristic and pixel values in the input image;
a determination unit configured to determine whether the pixel value range is included in the dynamic range;
a correction unit configured to correct the gradation conversion characteristic depending on a result of determination by the determination unit, wherein in a first case where the pixel value range in is included in the dynamic range, the correction unit does not correct the gradation conversion characteristic, and in a second case where the pixel value range is not included in the dynamic range, the correction unit corrects the gradation conversion characteristic by widening or shifting the pixel value range so that the pixel value range is included in the dynamic range; and
a gradation processing unit configured to apply gradation processing to the input image according to the gradation conversion characteristic in the first case or according to the corrected gradation conversion characteristic in the second case.

2. The image processing apparatus according to claim 1, wherein the correction unit corrects the gradation conversion characteristic by widening the pixel value range in which gradation is set so that the widened pixel value range is included in the dynamic range.

3. The image processing apparatus according to claim 2, wherein, if it is determined that the widened pixel value range is included in the dynamic range, the correction unit corrects the gradation conversion characteristic so that the widened pixel value range is widened by gradation conversion before the correction is included in the dynamic range and a gradation of a pixel value range smaller than the dynamic range is narrowed.

4. The image processing apparatus according to claim 1, wherein, if the determination unit determines that the pixel value range is not included in the dynamic range, the correction unit shifts the pixel value range in which gradation is set to be included in the dynamic range.

5. The image processing apparatus according to claim 1, wherein the correction unit shifts the pixel value range by a part of the pixel value range that is not included in the dynamic range.

6. The image processing apparatus according to claim 1, wherein, if the pixel value range is included in the dynamic range, the correction unit subjects the input image to processing for widening the gradation of the pixel value range, and, if the pixel value range is not included in the dynamic range, the correction unit shifts the pixel value range.

7. The image processing apparatus according to claim 1, wherein the one or more processors further function as an output unit configured to, if the dynamic range does not include a part of the pixel value range, output a warning.

8. The image processing apparatus according to claim 1, wherein the one or more processors further function as: a generation unit configured to generate a gradation conversion function based on a region of interest in the input image; and a setting unit configured to set a pixel value range in which a slope of the generated gradation conversion function is larger than a threshold value as a pixel value range in which a contrast of the image is emphasized.

9. The image processing apparatus according to claim 1, wherein the one or more processors further function as a region of interest (ROI) setting unit configured to set a region of interest according to one of a fixed two-dimensional area in the image and an imaging region of a subject.

10. The image processing apparatus according to claim 1, wherein the one or more processors further function as a control unit configured to control the correction unit to cause, if the pixel value range is included in the dynamic range, the correction unit to perform processing for emphasizing contrast of the pixel value range, and not to subject, if the pixel value range is not included in the dynamic range, the image to contrast emphasis processing.

11. A radiation imaging system comprising:
a radiation source;
a display unit configured to display an input image obtained by an X-ray sensor and processed by an image processing apparatus;
a memory storing a program; and
one or more processors which, by executing the program, function as:
an acquisition unit configured to acquire a gradation conversion characteristic;
a characteristic acquisition unit configured to acquire and input-output characteristic of the X-ray sensor and identify, according to the input-output characteristic, a dynamic range of the X-ray sensor in which a signal-to-noise ratio of an image obtained by the X-ray sensor is higher than a threshold value and in which linearity of an output of a signal component of the image is kept;
an image input unit configured to receive an input image;
an image analysis unit configured to determine a pixel value range to be emphasized in the input image, the pixel value range being set according to a slope of the gradation conversion characteristic and pixel values in the input image;
a determination unit configured to determine whether the pixel value range is included in the dynamic range;
a correction unit configured to correct the gradation conversion characteristic depending on a result of determination by the determination unit, wherein in a first case where the pixel value range is included in the dynamic range, the correction unit does not correct the gradation conversion characteristic, and in a second case where the pixel value range is not included in the dynamic range, the correction unit corrects the gradation conversion characteristic by widening or shifting the pixel value range so that the pixel value range is included in the dynamic range; and
a gradation processing unit configured to apply gradation processing to the input image according to the gradation conversion characteristic in the first case or according to the corrected gradation conversion characteristic in the second case.

12. An image processing method executed in an image processing apparatus comprising a memory storing a program and one or more processors which, by executing the program, perform the method comprising:
acquiring a gradation conversion characteristic;
acquiring an input-output characteristic of an X-ray sensor and identifying, according to the input-output characteristic, a dynamic range of the X-ray sensor in which a signal-to-noise ratio of an image obtained by the X-ray sensor is higher than a threshold value and in which linearity of an output of a signal component of the image is kept;
receiving an input image;
determining a pixel value range to be emphasized in the input image, the pixel value range being set according to a slope of the gradation conversion characteristic and pixel values in the input image;
determining whether the pixel value range is included in the dynamic range;
in a first case where the pixel value range is included in the dynamic range, the gradation conversion characteristic is not corrected,
in a second case where the pixel value range is not included in the dynamic range, correcting the gradation conversion characteristic by widening or shifting the pixel value range so that the pixel value range is included in the dynamic range; and
applying gradation processing to the input image according to the gradation conversion characteristic in the first case or according to the corrected gradation conversion characteristic in the second case.

13. A non-transitory computer-readable storage medium storing an instruction to cause a computer to execute the image processing method according to claim 12.

14. An image processing apparatus comprising:
a memory storing a program; and
one or more processors which, by executing the program, function as:
an acquisition unit configured to acquire a gradation conversion characteristic;
a characteristic acquisition unit configured to acquire an input-output characteristic of an X-ray sensor and identifying, according to the input-output characteristic and identify, according to the input-output characteristic, a dynamic range of the X-ray sensor, in which an output of a signal component captured by X-ray sensor is not saturated and in which a signal-to-noise ratio of an image obtained by the X-ray sensor is higher than a threshold value;
an image input unit configured to receive an input image;
an image analysis unit configured to determine a pixel value range to be emphasized in the input image, the pixel value range being set according to a slope of the gradation conversion characteristic and pixel values in the input image;
a determination unit configured to determine whether the pixel value range is included in the dynamic range; and
a correction unit configured to correct the gradation conversion characteristic depending on a result of determination by the determination unit, wherein in a first case where the pixel value range is included in the dynamic range, the correction unit does not correct the gradation conversion characteristic, and in a second case where the pixel value range is not included in the dynamic range, the correction unit corrects the gradation conversion characteristic by widening or shifting the pixel value range so that the pixel value range is included in the dynamic range; and
a gradation processing unit configured to apply gradation processing to the input image according to the gradation conversion characteristic in the first case or according to the corrected gradation conversion characteristic in the second case.

15. An image processing method executed in an image processing apparatus comprising a memory storing a program and one or more processors which, by executing the program, perform the method comprising:

acquiring a gradation conversion characteristic;

acquiring an input-output characteristic of an X-ray sensor and identifying, according to the input-output characteristic and identify, according to the input-output characteristic, a dynamic range of the X-ray sensor, in which an output of a signal component captured by the X-ray sensor is not saturated and in which a signal-to-noise ratio of an image obtained by the X-ray sensor is higher than a threshold value;

receiving an input image;

determining a pixel value range to be emphasized in the input image, the pixel value range being set according to a slope of the gradation conversion characteristic and pixel values in the input image;

determining whether the pixel value range is included in the dynamic range;

in a first case where the pixel value range is included in the dynamic range, the gradation conversion characteristic is not corrected, and in a second case where the pixel value range is not included in the dynamic range, correcting the gradation conversion characteristic by widening or shifting the pixel value range so that the pixel value range is included in the dynamic range; and applying gradation processing to the input image according to the gradation conversion characteristic in the first case or according to the corrected gradation conversion characteristic in the second case.

16. A non-transitory computer-readable storage medium storing instructions to cause a computer to execute the image processing method according to claim 15.

* * * * *